US012561566B2

(12) United States Patent
Ben-dror et al.

(10) Patent No.: US 12,561,566 B2
(45) Date of Patent: Feb. 24, 2026

(54) NEURAL NETWORK LAYER FOLDING

(71) Applicant: SAMSUNG ELECTRONICS CO., LTD., Suwon-si (KR)

(72) Inventors: Amir Ben-dror, Tel Aviv (IL); Niv Zehngut, Tel Aviv (IL); Evgeny Artyomov, Tel-Aviv (IL); Ran Vitek, Tel-Aviv (IL); Sapir Kaplan, Tel-Aviv (IL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1108 days.

(21) Appl. No.: 17/399,374

(22) Filed: Aug. 11, 2021

(65) Prior Publication Data

US 2022/0327386 A1      Oct. 13, 2022

Related U.S. Application Data

(60) Provisional application No. 63/171,757, filed on Apr. 7, 2021.

(51) Int. Cl.
G06N 3/082       (2023.01)
G06N 3/04        (2023.01)

(52) U.S. Cl.
CPC .............. G06N 3/082 (2013.01); G06N 3/04 (2013.01)

(58) Field of Classification Search
CPC ..... G06N 3/02–105; G06N 3/04–0499; G06N 3/082
See application file for complete search history.

(56) References Cited

U.S. PATENT DOCUMENTS

| | | | |
|---|---|---|---|
| 10,832,135 B2 | 11/2020 | Ji et al. | |
| 11,068,786 B1 * | 7/2021 | Liu ........................ | G06N 3/045 |
| 2018/0046915 A1 | 2/2018 | Sun et al. | |
| 2021/0192342 A1 * | 6/2021 | Hughes ................ | G06N 3/0675 |
| 2022/0076125 A1 * | 3/2022 | Mizukoshi ............... | G06N 3/08 |

OTHER PUBLICATIONS

DeadAd. Combining Convolution Operations. Apr. 5, 2020. StackExchange.com. <https://datascience.stackexchange.com/questions/71768/combining-convolution-operations> (Year: 2020).*

(Continued)

*Primary Examiner* — Liang Y Li
(74) *Attorney, Agent, or Firm* — Morgan, Lewis & Bockius LLP

(57)      ABSTRACT

The present disclosure describes neural network reduction techniques for decreasing the number of neurons or layers in a neural network. Embodiments of the method, apparatus, non-transitory computer readable medium, and system are configured to receive a trained neural network and replace certain non-linear activation units with an identity function. Next, linear blocks may then be folded to form a single block in places where the non-linear activation units were replaced by an identity function. Such techniques may reduce the number of layers in the neural network, which may optimize power and computation efficiency of the neural network architecture (e.g., without unduly influencing the accuracy of the network model).

20 Claims, 15 Drawing Sheets

(56) References Cited

OTHER PUBLICATIONS

Adaloglou, Nikolas. Intuitive Explanation of Skip Connections in Deep Learning. Mar. 23, 2020. TheAISummer.com <https://theaisummer.com/skip-connections/> (Year: 2020).*

Fan, Angela, Edouard Grave, and Armand Joulin. "Reducing transformer depth on demand with structured dropout." arXiv preprint arXiv:1909.11556 (2019). (Year: 2019).*

Ding, et al., "RepVGG: Making VGG-style ConvNets Great Again", arXiv:2101.03697v3 [cs.CV] Mar. 29, 2021, 10 pages.

Xu, et al., "Layer Pruning via Fusible Residual Convolutional Block for Deep Neural Networks", Peking and Xidian University, 2020, pp. 1-11.

Zhang, et al., "Layer Pruning for Accelerating Very Deep Neural Networks", 2019, 12 pages.

He, et al., "Delving Deep into Rectifiers: Surpassing Human-Level Performance on ImageNet Classification", arXiv:1502.01852v1 [cs.CV] Feb. 6, 2015, pp. 1-11.

Jha, et al., "DeepReDuce: ReLU Reduction for Fast Private Inference", Proceedings of the 38th International Conference on Machine Learning, PMLR 139, arXiv:2103.01396v2 [cs.LG] Jun. 22, 2021, 14 pages.

Ghodsi, et al., "CryptoNAS: Private Inference on a ReLU Budget", 34th Conference on Neural Information Processing Systems (NeurIPS 2020), arXiv:2006.08733v2 [cs.LG] May 13, 2021, 11 pages.

Jordao, et al., "Discriminative Layer Pruning for Convolutional Neural Networks", Journal of Latex Class Files, vol. 14, No. 8. Aug. 2019, pp. 1-10.

Chen, et al., "Shallowing Deep Networks: Layer-wise Pruning based on Feature Representations", IEEE, 2018, pp. 1-9.

Ma, et al., "Activate or Not: Learning Customized Activation", arXiv:2009.04759v2 [cs.CV[ Apr. 16, 2021, pp. 1-11.

* cited by examiner y = z y = 0

700 y = z y = α x

705

| | | |
|---|---|---|
| 1 - α | 1 - α | 1 - α |
| 1 - α | 1 | 1 - α |
| 1 - α | 1 - α | 1 - α |

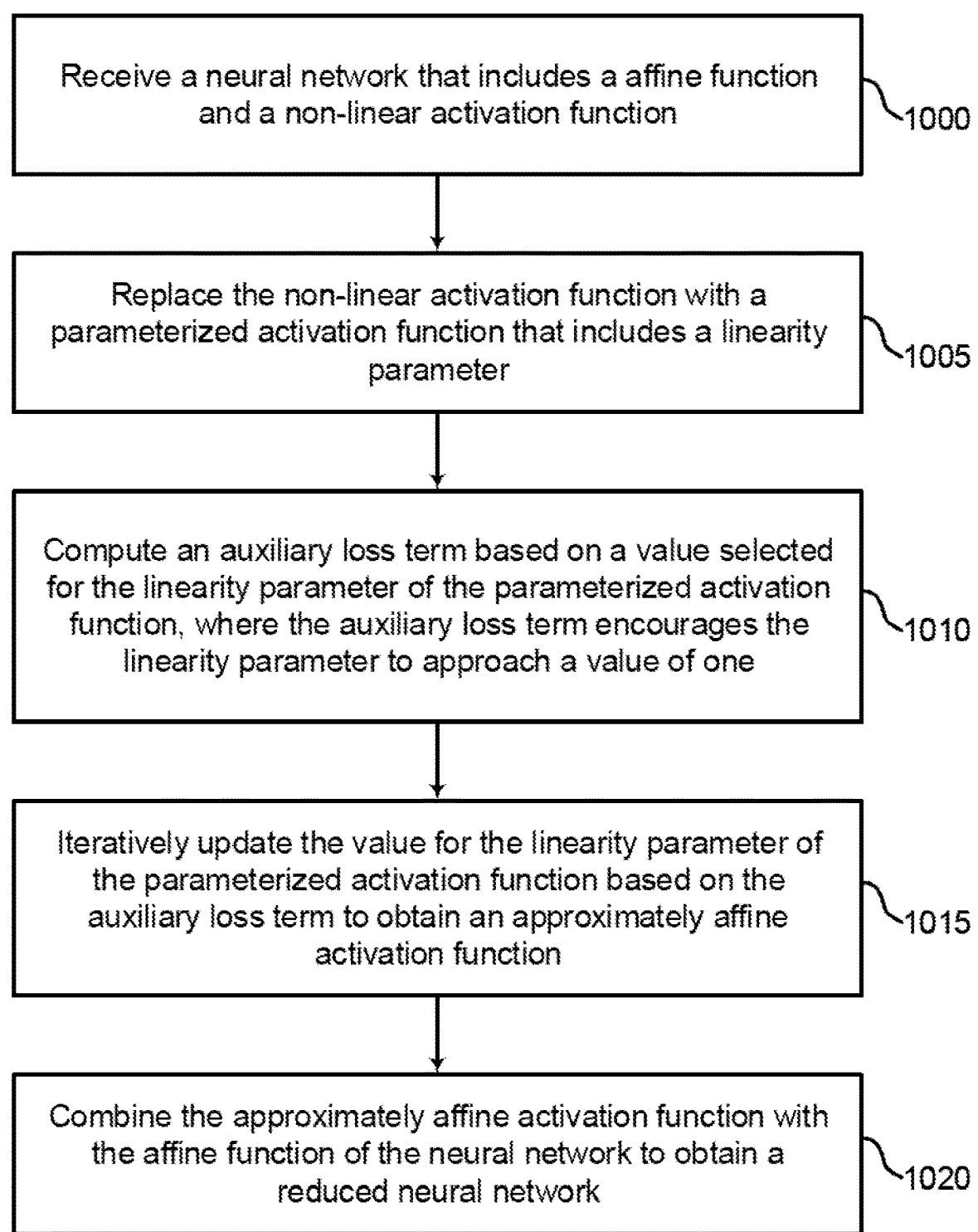

Receive a neural network that includes a affine function and a non-linear activation function ⟍1000

Replace the non-linear activation function with a parameterized activation function that includes a linearity parameter ⟍1005

Compute an auxiliary loss term based on a value selected for the linearity parameter of the parameterized activation function, where the auxiliary loss term encourages the linearity parameter to approach a value of one ⟍1010

Iteratively update the value for the linearity parameter of the parameterized activation function based on the auxiliary loss term to obtain an approximately affine activation function ⟍1015

Combine the approximately affine activation function with the affine function of the neural network to obtain a reduced neural network ⟍1020

FIG. 10

NEURAL NETWORK LAYER FOLDING

CROSS-REFERENCE TO RELATED APPLICATION

This application claims priority to, and the benefit of, U.S. Provisional Application Ser. No. 63/171,757 filed on Apr. 7, 2021. The entire contents of the foregoing application are hereby incorporated by reference for all purposes.

BACKGROUND

The following relates generally to neural network design, and more specifically to neural network reduction via neural network layer folding.

A neural network is a type of computer algorithm that is capable of learning specific patterns without being explicitly programmed, but through iterations over known data. A neural network may refer to a cognitive model that includes input nodes, hidden nodes, and output nodes. Within a neural network, nodes (e.g., which may be referred to as neurons) may be interconnected and operate collectively to process input data. Nodes in the network may have an activation function that computes whether the node is activated based on the output of previous nodes. Training the system may involve supplying values for the inputs, and modifying edge weights and activation functions (algorithmically or randomly) until the result closely approximates a set of desired outputs.

A depth of a neural network may refer to a number of layers in a neural network and a size of the neural network may refer to a number of nodes (or neurons) for each layer multiplied by the number of layers. As the depth and/or size of a neural network increases, the number of operations performed by the neural network may also increase (e.g., which may impact device power consumption, computational efficiency, etc.). For instance, some neural networks may include several (e.g., 30, 40, etc.) layers and millions of nodes, which may demand billions (e.g., 15 billion or more) of operations.

The use of artificial intelligence (AI) on devices such as computers, smartphones, tablets, and wearables has become more wide-spread and prevalent. Efficient and high-performing neural network processing is crucial to any AI applications and particularly more so if AI is deployed in devices with limited processing and storage capacities, such as in mobile devices. In some examples, devices may implement specialized hardware accelerators for performing specialized tasks with increased processing performance with reduced power consumption.

As such, development of a neural network may generally include a design stage (e.g., neural architecture search (NAS)), a training stage, a compression stage, and a compilation stage. Compression stage techniques may include pruning, quantization, knowledge distillation, etc. In some cases, such techniques may reduce the size or depth of a neural network, which may thus reduce the number of operations performed by the neural network. Accordingly, there is a need in the art for efficient neural network development techniques.

SUMMARY

The present disclosure describes neural network reduction techniques for decreasing the number of neurons or layers in a neural network. Embodiments of the method, apparatus, non-transitory computer readable medium, and system are configured to receive a trained neural network and replace certain non-linear activation units with an identity function. Next, linear blocks may then be collapsed or folded to form a single block in places where the non-linear activation units were replaced by an identity function. Such techniques may reduce the number of layers in the neural network, which may optimize power and computation efficiency of the neural network architecture (e.g., without unduly influencing the accuracy of the network model).

A method, apparatus, non-transitory computer readable medium, and system for neural network reduction via layer folding are described. One or more embodiments of the method, apparatus, non-transitory computer readable medium, and system include receiving or identifying a neural network that includes an affine function and a non-linear activation function, replacing the non-linear activation function with a parameterized activation function that includes a linearity parameter, iteratively adjusting the linearity parameter of the parameterized activation function to obtain an approximately affine activation function based on an auxiliary loss term, and reducing the neural network by combining the approximately affine activation function with the affine function of the neural network to obtain a reduced neural network.

An apparatus, system, and method for neural network reduction via layer folding are described. One or more embodiments of the apparatus, system, and method include a parameterization component configured to modify a neural network that includes an affine function and a non-linear activation function by replacing the non-linear activation function with a parameterized activation function that includes a linearity parameter, a training component configured to iteratively adjust the linearity parameter of the parameterized activation function to obtain an approximately affine activation function based on an auxiliary loss term, and a reduction component configured to combine the approximately affine activation function with the affine function of the neural network to obtain a reduced neural network.

A method, apparatus, non-transitory computer readable medium, and system for neural network reduction via layer folding are described. One or more embodiments of the method, apparatus, non-transitory computer readable medium, and system include identifying a neural network that includes an affine function and a non-linear activation function, replacing the non-linear activation function with a parameterized activation function that includes a linearity parameter, computing an auxiliary loss term based on a value selected for the linearity parameter of the parameterized activation function, wherein the auxiliary loss term encourages the linearity parameter to approach a value of one, iteratively updating the value for the linearity parameter of the parameterized activation function based on the auxiliary loss term to obtain an approximately affine activation function, and combining the approximately affine activation function with the affine function of the neural network to obtain a reduced neural network.

BRIEF DESCRIPTION OF THE DRAWINGS

FIG. 8 shows an example of three by three convolution diagram according to aspects of the present disclosure.

FIG. 10 shows an example of a process for neural network reduction via layer folding according to aspects of the present disclosure.

DETAILED DESCRIPTION

Figure 1:
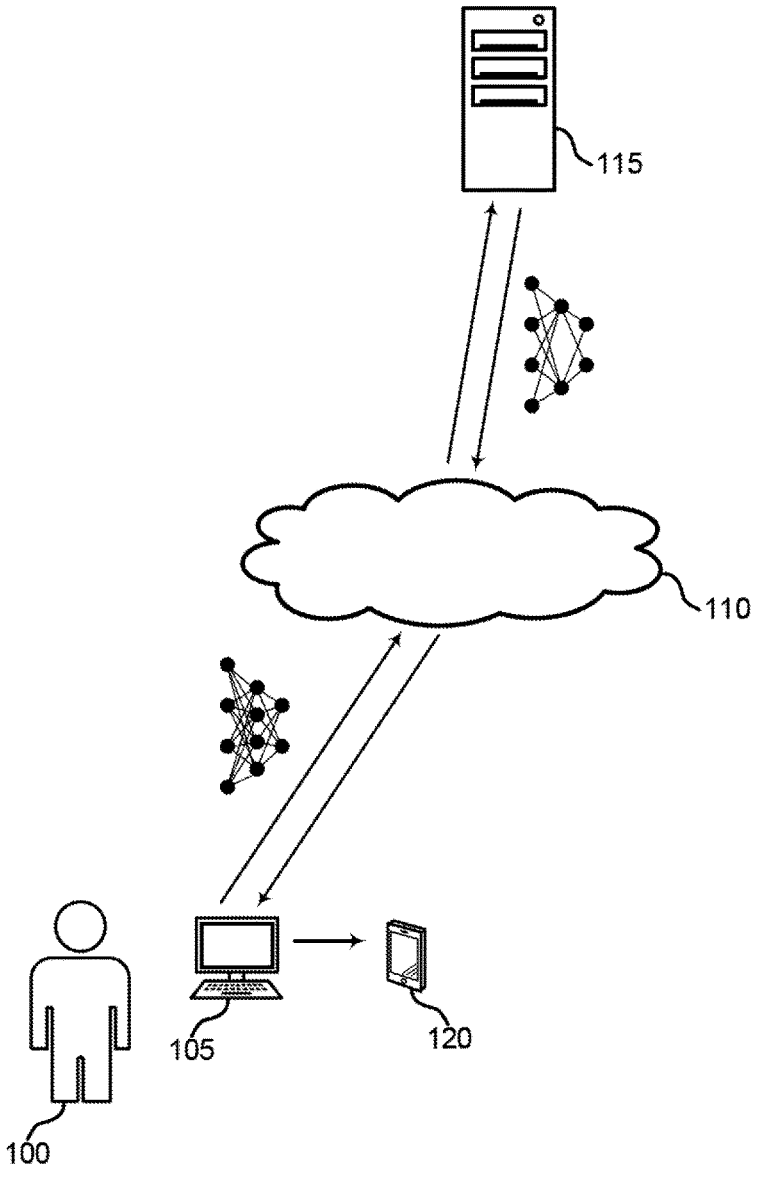
FIG. 1 shows an example of a neural network design system according to aspects of the present disclosure.

Efficient and high-performing neural network processing is becoming important on devices such as computers, smart-phones, tablets, and wearables. General computation units such as central processing unit (CPUs), graphics processing units (GPUs) and neural processing units (NPUs) may perform tasks using specific hardware. A Specific Neural Processor (SNP) may be used for neural network processing, where the SNP may execute a specific network (e.g., a specific convolutional neural network (CNN), a specific artificial neural network (ANN), etc.) with high efficiency. In some examples, applications that are always powered on, with low power or low latency, may use SNP. Neural network architecture is the set of rules and methods that describe the functionality, organization, and implementation of a neural network. Architecture may refer to selecting and interconnecting hardware components to create computers that meet functional, performance, and financial design constraints.

A neural network is a type of computer algorithm that is capable of learning specific patterns without being explicitly programmed, but through iterations over known data. A neural network may refer to a cognitive model (e.g., inspired by the human brain) that includes input nodes, hidden nodes, and output nodes. Nodes in the network may have an activation function that computes whether the node is acti-vated based on the output of previous nodes. Training the system may involve supplying values for the inputs and modifying edge weights and activation functions (algorith-mically or randomly) until the result closely approximates a set of desired outputs.

A neural network architecture may include numerous layers to enhance the accuracy of the neural network model. As a result, the number of neural network computations, the power consumption, and the overall computation latency may increase. Therefore, there is a need in the art for systems and methods to optimize neural network architectures with-out unduly influencing the accuracy of the network model. For example, development of a neural network may gener-ally include a design stage (e.g., neural architecture search (NAS)), a training stage, a compression stage, and a com-pilation stage. Compression stage techniques may include pruning, quantization, knowledge distillation, etc., and may be implemented to collapse or reduce the number of layers in a neural network. The term "reducing a neural network" refers to the process of modifying the neural network by removing parameters of function in a manner that the output of the reduced neural network approximates that of the original neural network.

The present disclosure describes systems and methods for optimizing or reducing neural network architectures by removing certain activation functions between layers of a neural network. For example, instead of (or in addition to) removing layers directly using pruning techniques, activa-tions between layers may be efficiently collapsed or folded according to embodiments described herein to reduce neural network architectures. For instance, many operations in neural networks may include linear functions separated by non-linear activation functions (e.g., such as rectified linear unit (ReLU) functions, or ReLU blocks). Removing an activation from the network creates a composition of linear (e.g., affine) operations that can efficiently be "collapsed" into an equivalent linear layer. Thus, removing activations (non-linearity) is equivalent to removing layers.

One or more embodiments of the disclosure identify and remove certain non-linear layers in a trained neural network. For example, activation functions can be combined into groups to combine larger chunks of layers together. Multiple linear layers adjacent to the removed non-linear layers are then combined into a single layer resulting in size reduction of the network. In addition, trainable activation parameters can be shared with kernel mask parameters for reducing the final folded layer size. The reduction in architecture of the network enhances power and decreases latency of the net-work model and may be implemented in smart devices, for example, phones, watches, robots, etc.

Embodiments of the present disclosure may be used in the context of a neural network design system. For example, a neural network design apparatus based on the present dis-closure may take a trained neural network and reduce the neural network according to techniques described herein. An example of an application of the inventive concept in the neural network design and neural network reduction context is provided with reference to FIGS. 1 and 2. Details regard-ing the architecture of an example neural network design system are provided with reference to FIGS. 3 and 4. Examples of processes for neural network reduction are provided with reference to FIGS. 5 through 10. One or more aspects of reduced (e.g., collapsed or folded) neural net-works are described with reference to FIGS. 11 through 15.

Neural Network Design System

FIG. 1 shows an example of a neural network design system according to aspects of the present disclosure. The example shown includes user 100, user device 105, cloud 110, neural network design apparatus 115, and edge device 120. A neural network design apparatus 115 may receive a trained neural network (e.g., from user device 105 via cloud 110), and the neural network design apparatus 115 may perform neural network layer folding techniques described herein and output a reduced neural network (e.g., where the reduced neural network may be implemented on edge device 120 for more efficient applications of such reduced neural networks).

Neural networks may be used in various computing and processing systems. For example, convolutional neural net-works (CNNs) are utilized in computer vision applications including object detection, image classification, segmenta-tion, etc. According to techniques described herein, neural networks may be developed within a neural network design system, where optimized neural networks may then be implemented on edge devices 120 (e.g., phones, augmented and virtual reality technology sets, smart watches, robots, etc.). For instance, neural network development flow may include a design stage (e.g., NAS), a training stage, a compression stage, and a compilation stage. In the example of FIG. 1, a trained neural network may be designed by a user 100, where the user 100 may pass a trained neural network to a neural network design apparatus 115 via user device 105. During a compression stage, neural network design apparatus 115 may further reduce the trained neural network according to embodiments further described herein.

Once a neural network is compiled, the neural network may be implemented on edge devices 120. Edge devices 120 may be power limited, and performance of such edge devices 120 (e.g., in terms of computation latency, neural network accuracy, etc.) may be important in terms of ultimate user experience. As such, neural network power consumption and computation time become critical design constraints during neural network development. Methods of embodiments of the present disclosure improve neural network processing and functionalities and optimize neural network power consumption and/or latency in edge device 120 applications including machine learning, computer vision, image processing, etc.

As used herein, a reduced neural network may generally refer to a neural network architecture with one or more nodes (or one or more layers) folded or removed from a trained neural network. In some cases, a reduced neural network may thus correspond to an optimized version of a neural network where a reduced number of computations may be performed without significantly impacting neural network performance for a particular computation task. In one or more embodiments described herein, a reduced neural network includes or refers to removing an activation from a trained neural network to create a composition of linear (affine) operations that can be collapsed or folded into a substantially equivalent single linear layer.

A user device 105 and/or edge device 120 may each include or refer to a computing device such as a personal computer, laptop computer, mainframe computer, palmtop computer, personal assistant, mobile device, or any other suitable processing apparatus. A user device 105 may generally refer to a device used to generate and develop a neural network architecture (e.g., based on user 100 set design constraints). An edge device 120 may generally refer to a device used to implement a neural network application. In some cases, user device 105 and edge device 120 may be a same device.

In some cases, edge device 120 may include an NPU. An NPU is a microprocessor that specializes in the acceleration of machine learning algorithms. For example, an NPU may operate on predictive models such as ANNs or random forests (RFs). In some cases, an NPU is designed in a way that makes it unsuitable for general purpose computing such as that performed by a CPU. Additionally or alternatively, the software support for an NPU may not be developed for general purpose computing.

A cloud 110 is a computer network configured to provide on-demand availability of computer system resources, such as data storage and computing power. In some examples, the cloud 110 provides resources without active management by the user 100. The term cloud 110 is sometimes used to describe data centers available to many users 100 over the Internet. Some large cloud networks have functions distributed over multiple locations from central servers. A server is designated an edge server if it has a direct or close connection to a user 100. In some cases, a cloud 110 is limited to a single organization. In other examples, the cloud 110 is available to many organizations. In one example, a cloud 110 includes a multilayer communications network comprising multiple edge routers and core routers. In another example, a cloud 110 is based on a local collection of switches in a single physical location.

In some examples, neural network design apparatus 115 may include one or more aspects of a server. A server provides one or more functions to users 100 linked by way of one or more of the various networks. In some cases, the server includes a single microprocessor board, which includes a microprocessor responsible for controlling all aspects of the server. In some cases, a server uses microprocessor and protocols to exchange data with other devices or users 100 on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

A database is an organized collection of data. For example, a database stores data in a specified format known as a schema. A database may be structured as a single database, a distributed database, multiple distributed databases, or an emergency backup database. In some cases, a database controller may manage data storage and processing in a database. In some cases, a user 100 interacts with database controller. In other cases, database controller may operate automatically without user 100 interaction.

In some examples, FIG. 1 may illustrate one or more aspects of an ANN design system. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted. During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

In some examples, FIG. 1 may illustrate one or more aspects of a convolutional neural network (CNN) design system. A CNN is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

In some examples, FIG. 1 may illustrate one or more aspects of a multilayer perceptron (MLP) neural network design system. An MLP is a feed forward neural network that typically consists of multiple layers of perceptrons. Each component perceptron layer may include an input layer, one or more hidden layers, and an output layer. Each node may include a non-linear activation function. An MLP may be trained using backpropagation (i.e., computing the gradient of the loss function with respect to the parameters).

Figure 2:
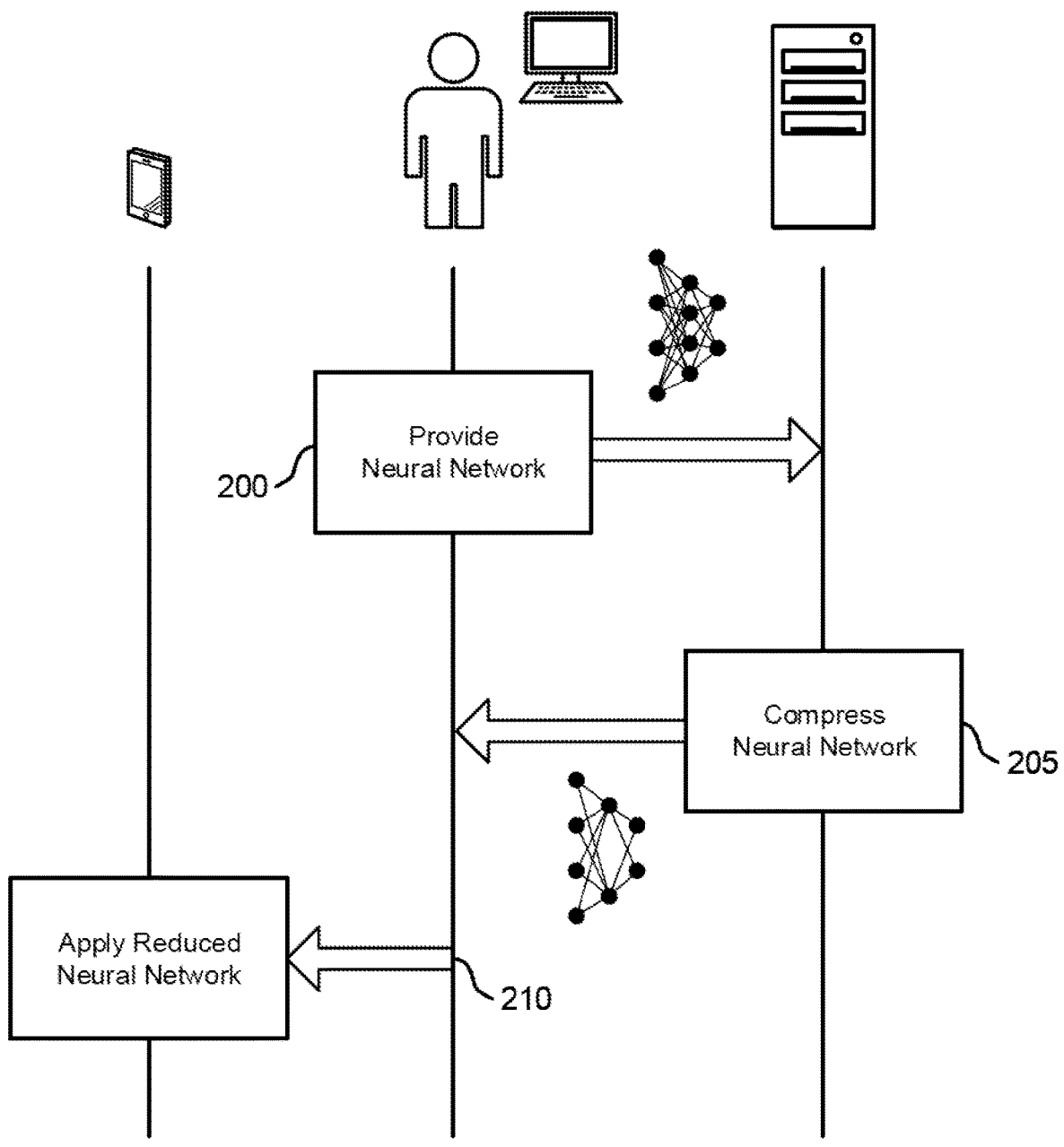
FIG. 2 shows an example of a process for designing a neural network according to aspects of the present disclosure.

FIG. 2 shows an example of a process for designing a neural network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

The development of a neural network includes a design stage followed by training, compression, and compilation. The present disclosure describes systems and methods for neural network reduction by decreasing the number of layers in the neural network. One or more embodiments of the present disclosure include receiving a trained neural network (e.g., a neural network developed by a user and user device via NAS) and learning the non-linear activation units that can be replaced with an identity function. Next, linear blocks may be folded to form a single block in places where the non-linear units (e.g., non-linear activation functions) were replaced by an identity function.

For instance, at operation 200, the system provides a trained neural network. In some examples, neural network design is performed manually or automatically using algorithms (e.g., NAS). In some cases, the operations of this step refer to, or may be performed by, a user device as described with reference to FIG. 1. In some cases, the operations of this step refer to, or may be performed by, a user and/or a user device as described with reference to FIG. 1.

At operation 205, the system compresses layers and reduce the neural network. The compression step is a combination of different algorithms (e.g., pruning, quantization, knowledge distillation, etc.). Any of such techniques may be used as standalone techniques or in combination with each other to reduce a neural network. For instance, in some implementations, one or more embodiments of the present disclosure compliment or replace techniques or algorithms on the compression stage. In some cases, the operations of this step refer to, or may be performed by, a neural network design apparatus as described with reference to FIG. 1. Further, one or more aspects of operation 205 are further described and illustrated herein, for example, with reference to FIGS. 4 and 6.

At operation 210, the system applies the reduced neural network. In some cases, the operations of this step refer to, or may be performed by, an edge device as described with reference to FIG. 1. For instance, some edge devices may benefit from implementation of reduced neural networks (e.g., to increase edge device performance when implementing reduced neural networks via reduced power consumption, reduced computation latency, etc.).

System Architecture

Figure 3:
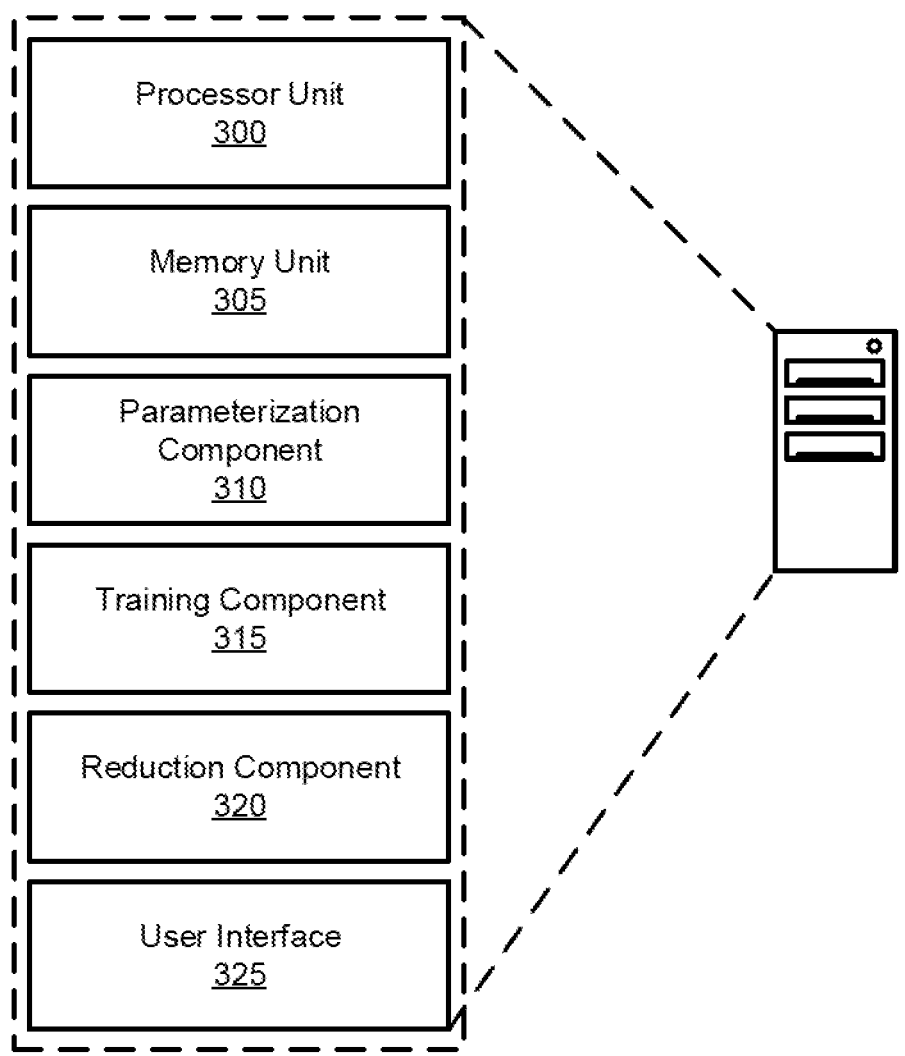
FIG. 3 shows an example of a neural network design apparatus according to aspects of the present disclosure.

FIG. 3 shows an example of a neural network design apparatus according to aspects of the present disclosure. The example shown includes processor unit 300, memory unit 305, parameterization component 310, training component 315, reduction component 320, and user interface 325.

A processor unit 300 is an intelligent hardware device, (e.g., a general-purpose processing component, a digital signal processor (DSP), a CPU, a GPU, a microcontroller, an application specific integrated circuit (ASIC), a field programmable gate array (FPGA), a programmable logic device, a discrete gate or transistor logic component, a discrete hardware component, or any combination thereof). In some cases, the processor unit 300 is configured to operate a memory array using a memory controller. In other cases, a memory controller is integrated into the processor unit 300. In some cases, the processor unit 300 is configured to execute computer-readable instructions stored in a memory to perform various functions. In some embodiments, a processor unit 300 includes special purpose components for modem processing, baseband processing, digital signal processing, or transmission processing.

Examples of a memory unit 305 (e.g., or memory device) include random access memory (RAM), read-only memory (ROM), or a hard disk. Examples of memory units 305 include solid state memory and a hard disk drive. In some examples, memory unit 305 is used to store computer-readable, computer-executable software including instructions that, when executed, cause a processor to perform various functions described herein. In some cases, the memory unit 305 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory unit 305 store information in the form of a logical state.

A user interface 325 may enable a user to interact with a device. In some embodiments, the user interface 325 may include an audio device, such as an external speaker system, an external display device such as a display screen, or an input device (e.g., remote control device interfaced with the user interface 325 directly or through an input/output (IO) controller module). In some cases, a user interface 325 may be a graphical user interface 325 (GUI).

According to some embodiments, parameterization component 310 receives a neural network that includes an affine function and a non-linear activation function. In some examples, parameterization component 310 replaces the non-linear activation function with a parameterized activation function that includes a linearity parameter. In some examples, the parameterized activation function includes the non-linear activation function, an additive inverse of a product of the linearity parameter and the non-linear activation function, and a product of the linearity parameter and a target affine function. In some examples, the parameterized activation function includes the non-linear activation function, a product of the linearity parameter and the non-linear activation function, and a product of an additional parameter and a target affine function. In some examples, parameterization component 310 replaces a set of non-linear activation functions with a set of parameterized activation functions having a same linearity parameter. In some examples, the non-linear activation function includes one or more ReLU blocks, and the parameterized activation function includes one or more parametric ReLU blocks.

According to some embodiments, parameterization component 310 is configured to modify a neural network that includes an affine function and a non-linear activation function by replacing the non-linear activation function with a parameterized activation function that includes a linearity parameter.

According to some embodiments, parameterization component 310 receives a neural network that includes an affine function and a non-linear activation function. In some examples, parameterization component 310 replaces the non-linear activation function with a parameterized activation function that includes a linearity parameter. In some examples, parameterization component 310 computes an auxiliary loss term based on a value selected for the linearity parameter of the parameterized activation function, where the auxiliary loss term encourages the linearity parameter to approach a value of one.

Parameterization component 310 is an example of, or includes aspects of, the corresponding element described with reference to FIG. 4.

According to some embodiments, training component 315 iteratively adjusts the linearity parameter of the parameterized activation function to obtain an approximately affine activation function based on an auxiliary loss term. In some examples, the iteratively adjusts the linearity parameter includes selecting a value for the linearity parameter, computing the auxiliary loss term based on the selected value, and updating the value for the linearity parameter based on the auxiliary loss term. In some examples, the auxiliary loss term encourages the linearity parameter to approach a value that causes the parameterized activation function to approach a target affine function.

According to some embodiments, training component 315 is configured to iteratively adjust the linearity parameter of the parameterized activation function to obtain an approximately affine activation function based on an auxiliary loss term. In some examples, the training component 315 is further configured to select a value for the linearity parameter, compute the auxiliary loss term based on the selected value, and update the value for the linearity parameter based on the auxiliary loss term.

According to some embodiments, training component 315 iteratively updates the value for the linearity parameter of the parameterized activation function based on the auxiliary loss term to obtain an approximately affine activation function.

Training component 315 is an example of, or includes aspects of, the corresponding element described with reference to FIG. 4.

According to some embodiments, reduction component 320 combines the approximately affine activation function with the affine function of the neural network to obtain a reduced neural network. In some examples, the combines the approximately affine activation function with the affine function of the neural network includes combining the approximately affine activation function with a first affine function before the approximately affine activation function and a second affine function after the approximately affine activation function. In some examples, the combines the approximately affine activation function with the affine function of the neural network includes eliminating a skip connection of the neural network. In some examples, reduction component 320 combines the set of non-linear activation functions with a set of affine functions to obtain the reduced neural network. In some examples, the set of non-linear activation functions is bypassed by a same skip connection. In some examples, the set of non-linear activation functions includes a kernel boundary of a convolutional neural network. In some examples, reduction component 320 refines the reduced neural network based on a loss function that does not include the auxiliary loss term. In some examples, the neural network includes a CNN, and the reduced neural network includes the CNN with a reduced number of layers. In some examples, the reduced neural network includes the CNN with a reduced number of layers.

According to some embodiments, reduction component 320 is configured to combine the approximately affine activation function with the affine function of the neural network to obtain a reduced neural network. In some examples, the reduction component 320 is further configured to combine the approximately affine activation function with a first affine function before the approximately affine activation function and a second affine function after the approximately affine activation function. In some examples, the reduction component 320 is further configured to replace a set of non-linear activation functions with a set of parameterized activation functions having a same linearity parameter and combine the set of non-linear activation functions to obtain the reduced neural network.

According to some embodiments, reduction component 320 combines the approximately affine activation function with the affine function of the neural network to obtain a reduced neural network. In some examples, reduction component 320 refines the reduced neural network based on a loss function that does not include the auxiliary loss term.

Reduction component 320 is an example of, or includes aspects of, the corresponding element described with reference to FIG. 4.

Figure 4:
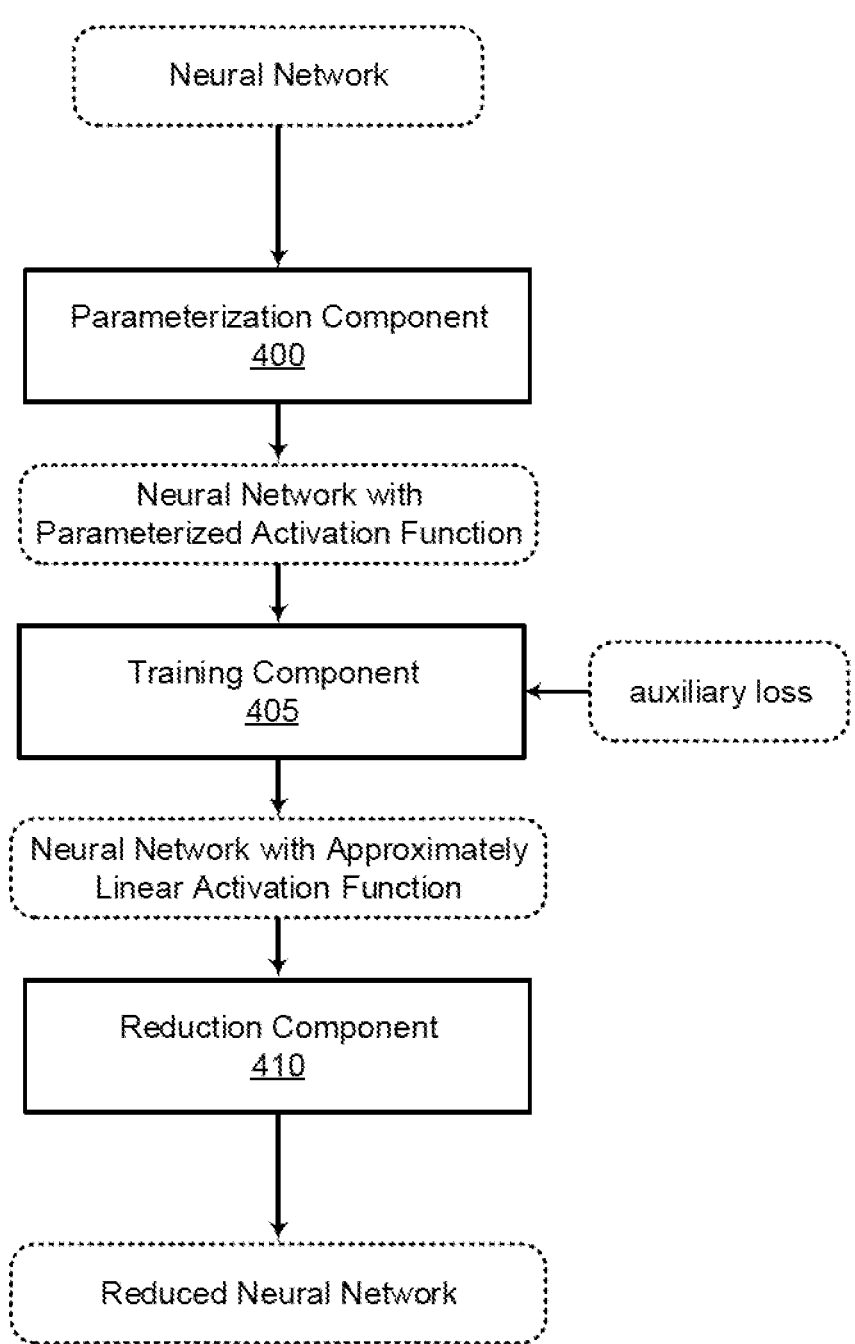
FIG. 4 shows an example of a process for designing a neural network according to aspects of the present disclosure.

FIG. 4 shows an example of a process for designing a neural network according to aspects of the present disclosure. The example shown includes parameterization component 400, training component 405, and reduction component 410. Parameterization component 400 is an example of, or includes aspects of, the corresponding element described with reference to FIG. 3. Training component 405 is an example of, or includes aspects of, the corresponding element described with reference to FIG. 3. Reduction component 410 is an example of, or includes aspects of, the corresponding element described with reference to FIG. 3.

The present disclosure describes use of layer folding to reduce the number of layers in the neural network chain. One or more embodiments of the present disclosure include combination of adjacent linear layers into a single block by removing appropriate (e.g., non-linear or nonaffine) activation functions. Activation functions can be combined into groups and share the same parameters to combine multiple layers. Additionally, trainable activation parameters are shared with kernel mask parameters to reduce the size of the final folded layer.

An apparatus for neural network reduction via layer folding is described. One or more embodiments of the apparatus include a parameterization component 400, a training component 405, and a reduction component 410 (e.g., a neural network reduction component). In some embodiments, the parameterization component 400 may be configured to modify a neural network that includes an affine function and a non-linear activation function by replacing the non-linear activation function with a parameterized activation function that includes a linearity parameter. In some embodiments, the training component 405 configured to iteratively adjust the linearity parameter of the parameterized activation function to obtain an approximately affine activation function based on an auxiliary loss term. In some embodiments, the reduction component 410 configured to combine the approximately affine activation function with the affine function of the neural network to obtain a reduced neural network.

A system for neural network reduction via layer folding is also described. The system comprising: a parameterization component configured to modify a neural network that includes an affine function and a non-linear activation function by replacing the non-linear activation function with a parameterized activation function that includes a linearity parameter, a training component configured to iteratively adjust the linearity parameter of the parameterized activation function to obtain an approximately affine activation function based on an auxiliary loss term, and a reduction component configured to combine the approximately affine activation function with the affine function of the neural network to obtain a reduced neural network.

A method of using an apparatus for neural network reduction via layer folding is also described. The method includes using a parameterization component configured to modify a neural network that includes an affine function and a non-linear activation function by replacing the non-linear activation function with a parameterized activation function that includes a linearity parameter, using a training component configured to iteratively adjust the linearity parameter of the parameterized activation function to obtain an approximately affine activation function based on an auxiliary loss term, and using a reduction component configured to combine the approximately affine activation function with the affine function of the neural network to obtain a reduced neural network.

In some examples, the training component is further configured to select a value for the linearity parameter, compute the auxiliary loss term based on the selected value, and update the value for the linearity parameter based on the auxiliary loss term. In some examples, the reduction component is further configured to combine the approximately affine activation function with a first affine function before the approximately affine activation function and a second affine function after the approximately affine activation function. In some examples, the reduction component is further configured to replace a plurality of non-linear activation functions with a plurality of parameterized activation functions having a same linearity parameter and combine the plurality of non-linear activation functions to obtain the reduced neural network.

Neural Network Reduction Process

Figure 5:
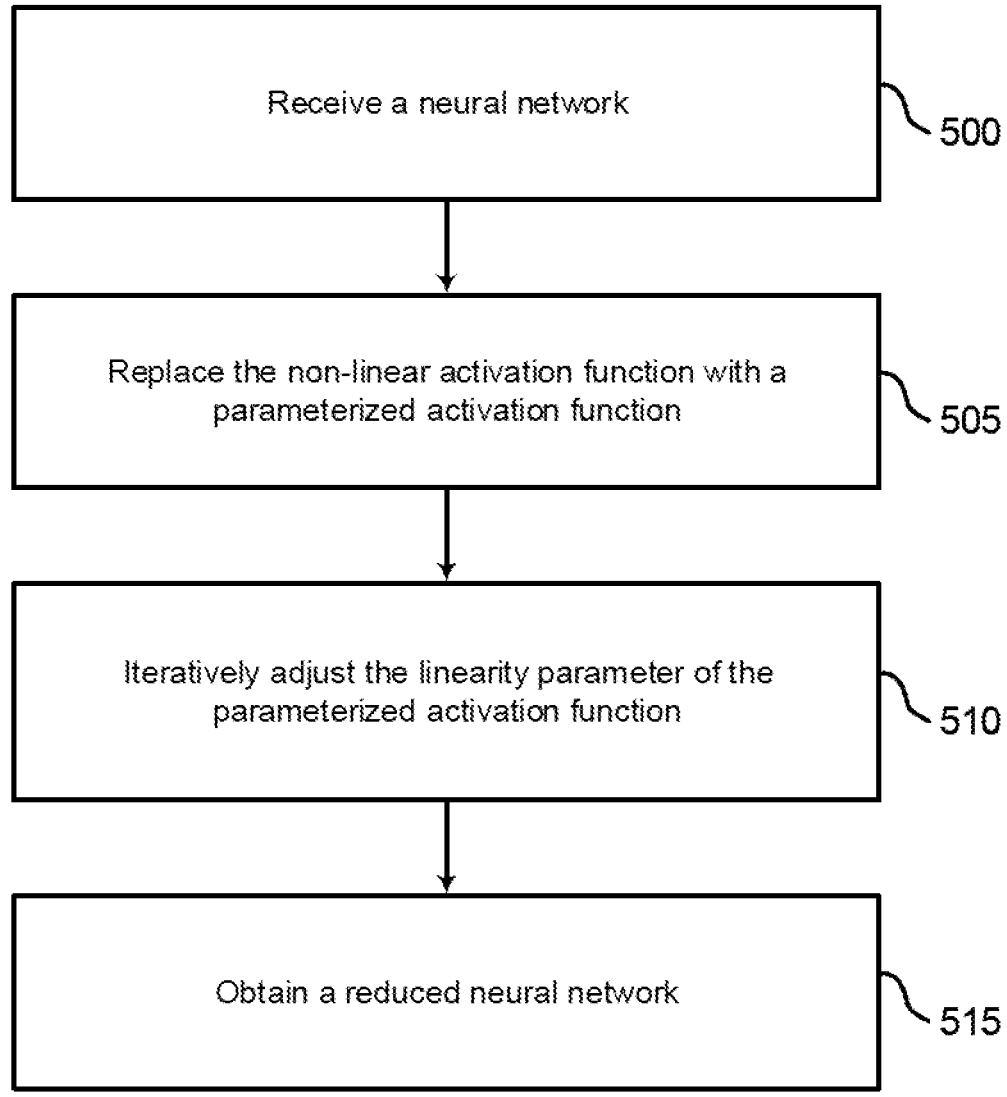
FIGS. 5 through 6 show examples of a process for neural network reduction via layer folding according to aspects of the present disclosure.

FIG. 5 shows an example of a process for neural network reduction via layer folding according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

A method for neural network reduction via layer folding is described. One or more embodiments of the method include identifying a neural network that includes an affine function and a non-linear activation function, replacing the non-linear activation function with a parameterized activation function that includes a linearity parameter, and iteratively adjusting the linearity parameter of the parameterized activation function to obtain an approximately affine activation function based on an auxiliary loss term. One or more embodiments of the described methods further include combining the approximately affine activation function with the affine function of the neural network to obtain a reduced neural network.

At operation 500, the system receives a neural network that includes an affine function and a non-linear activation function. In some cases, the operations of this step refer to, or may be performed by, a parameterization component as described with reference to FIGS. 3 and 4.

At operation 505, the system replaces the non-linear activation function with a parameterized activation function that includes a linearity parameter. In some cases, the operations of this step refer to, or may be performed by, a parameterization component as described with reference to FIGS. 3 and 4.

At operation 510, the system iteratively adjusts the linearity parameter of the parameterized activation function to obtain an approximately affine activation function based on an auxiliary loss term. In some cases, the operations of this step refer to, or may be performed by, a training component as described with reference to FIGS. 3 and 4.

At operation 515, the system combines the approximately affine activation function with the affine function of the neural network to obtain a reduced neural network. In some cases, the operations of this step refer to, or may be performed by, a reduction component as described with reference to FIGS. 3 and 4.

An apparatus for neural network reduction via layer folding is described. The apparatus includes a processor, memory in electronic communication with the processor, and instructions stored in the memory. The instructions are operable to cause the processor to perform the steps of identifying a neural network that includes an affine function and a non-linear activation function, replacing the non-linear activation function with a parameterized activation function that includes a linearity parameter, iteratively adjusting the linearity parameter of the parameterized activation function to obtain an approximately affine activation function based on an auxiliary loss term, and combining the approximately affine activation function with the affine function of the neural network to obtain a reduced neural network.

A non-transitory computer readable medium storing code for neural network reduction via layer folding is described. In some examples, the code comprises instructions executable by a processor to perform the steps of: identifying a neural network that includes an affine function and a non-linear activation function, replacing the non-linear activation function with a parameterized activation function that includes a linearity parameter, iteratively adjusting the linearity parameter of the parameterized activation function to obtain an approximately affine activation function based on an auxiliary loss term, and combining the approximately affine activation function with the affine function of the neural network to obtain a reduced neural network.

A system for neural network reduction via layer folding is described. One or more embodiments of the system include identifying a neural network that includes an affine function and a non-linear activation function, replacing the non-linear activation function with a parameterized activation function that includes a linearity parameter, iteratively adjusting the linearity parameter of the parameterized activation function to obtain an approximately affine activation function based on an auxiliary loss term, and combining the approximately affine activation function with the affine function of the neural network to obtain a reduced neural network.

In some examples, the parameterized activation function includes the non-linear activation function, an additive inverse of a product of the linearity parameter and the non-linear activation function, and a product of the linearity parameter and a target affine function. In some examples, the parameterized activation function includes the non-linear activation function, a product of the linearity parameter and the non-linear activation function, and a product of an additional parameter and a target affine function.

In some examples, the iteratively adjusting the linearity parameter comprises selecting a value for the linearity parameter, computing the auxiliary loss term based on the selected value, and updating the value for the linearity parameter based on the auxiliary loss term. In some examples, the auxiliary loss term encourages the linearity parameter to approach a value that causes the parameterized activation function to approach a target affine function. In some examples, the combining the approximately affine activation function with the affine function of the neural network comprises combining the approximately affine activation function with a first affine function before the approximately affine activation function and a second affine function after the approximately affine activation function.

In some examples, the combining the approximately affine activation function with the affine function of the neural network comprises eliminating a skip connection of the neural network. Some examples of the method, apparatus, non-transitory computer readable medium, and system further include replacing a plurality of non-linear activation functions with a plurality of parameterized activation functions having a same linearity parameter. Some examples further include combining the plurality of non-linear activation functions with a plurality of affine functions to obtain the reduced neural network. In some examples, the plurality of non-linear activation functions is bypassed by a same skip connection.

In some examples, the plurality of non-linear activation functions comprises a kernel boundary of a convolutional neural network. Some examples of the method, apparatus, non-transitory computer readable medium, and system further include refining the reduced neural network based on a loss function that does not include the auxiliary loss term. In some examples, the non-linear activation function comprises one or more ReLU blocks, and the parameterized activation function comprises one or more parametric ReLU blocks.

In some examples, the neural network comprises a CNN and the reduced neural network comprises the CNN with a reduced number of layers. In some examples, the reduced neural network comprises the CNN with a reduced number of layers.

Figure 6:
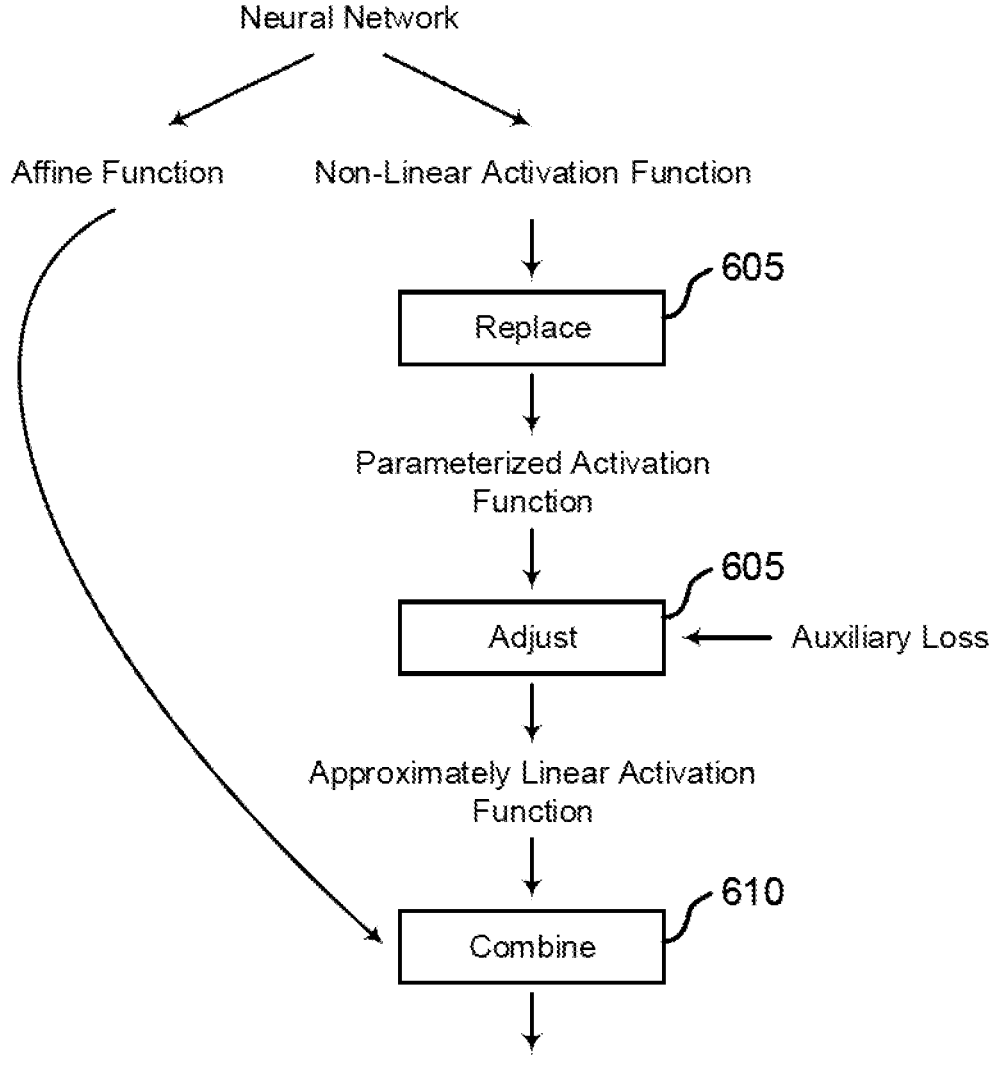

FIG. 6 shows an example of a process for neural network reduction via layer folding according to aspects of the present disclosure. The present disclosure describes systems and methods for optimizing neural network architectures by removing certain activation functions between layers of a neural network. That is, instead of (or in addition to) removing layers directly using pruning techniques, activations between layers may be efficiently folded according to techniques described herein to reduce neural network architectures.

For example, a neural network may process input data (or signals) with a set of operations that may be referred to as layers. A neural network may include linear and non-linear layers. In some cases, layers may be referred to as affine or nonaffine, where a linear layer may be a subset of affine layers, and non-linear layers may be a subset of nonaffine layers. For example, an affine function may include or refer to a linear function with a translation (e.g., where a linear function may fix the origin, the translation may map the function somewhere else). In other words, an affine function may be a linear function if the affine function fixes the origin. Moreover, some layers of a neural network may include a linear function (or an affine function) and a non-linear activation function.

In the example of FIG. 6, according to techniques described herein, non-linear activation functions (e.g., or non-affine activation functions) may be replaced with a parameterized activation function (e.g., a parameterized activation function that includes a linearity parameter). The linearity parameter of the parameterized activation function may be trained (e.g., iteratively adjusted) to obtain an approximately affine activation function (e.g., based on an auxiliary loss term, as described in more detail herein, for example, with reference to FIGS. 7A and 7B). The approximately affine activation function may then be combined with the affine function of the neural network to obtain a reduced neural network.

In some cases, decisions on whether to collapse aspects of a trained neural network may depend on the reduced neural network implementation on an edge device. For example, edge device design constraints (e.g., power constraints, hardware constraints, etc.), edge device use cases for the reduced neural network, etc., may be taken into account during a neural network folding stage in determining, for example, what activation functions are collapsed or folded.

For example, FIG. 6 shows an example of a process for neural network reduction via layer folding according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

In some examples, a neural network (e.g., a trained neural network) may include combinations of affine functions and non-linear activation functions (e.g., based on a NAS for a given neural network implementation). At 600, at least one non-linear activation function is replaced with a parameterized activation function that includes a linearity parameter. At 605, the linearity parameter of the parameterized activation function may be adjusted (e.g., trained, iteratively adjusted, etc.) to obtain an approximately affine activation function. In one or more embodiments described herein, the linearity parameter of the parameterized activation function may be adjusted to obtain an approximately affine activation function based on an auxiliary loss term. At 610, the obtained approximately affine activation function is combined with the affine function of the neural network to obtain a reduced neural network.

As described herein, similar processes may be applied with, for example, neural networks that include a linear function and a non-linear activation function, a linear function and a non-affine activation function, an affine function and a non-affine activation function, etc., by analogy, without departing from the scope of the present disclosure.

Figure 7A:
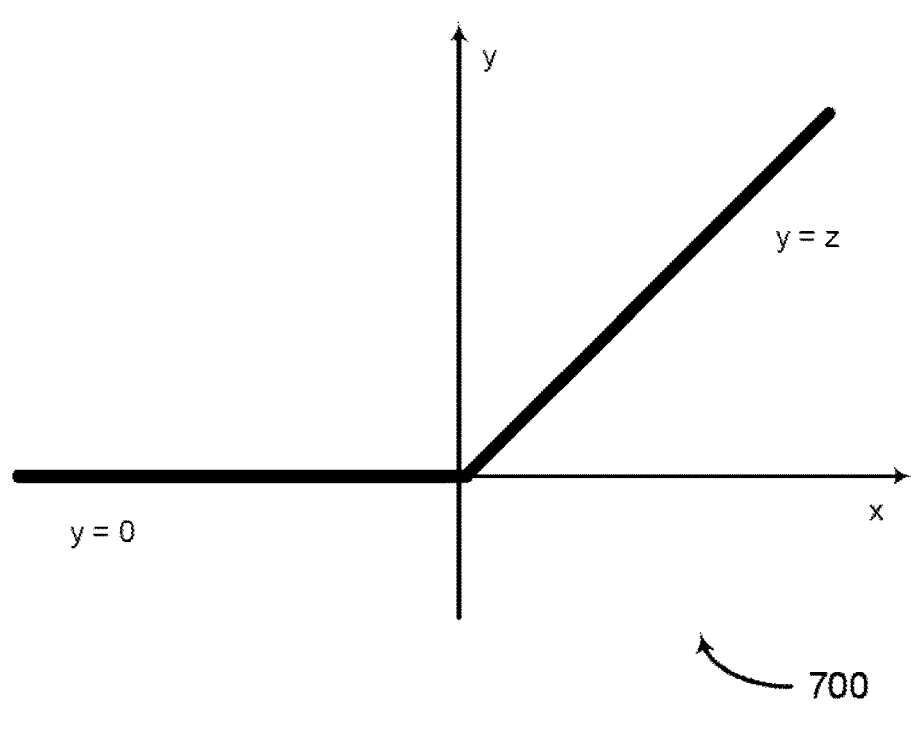
FIGS. 7A and 7B show example activation function diagrams according to aspects of the present disclosure.
Figure 7B:
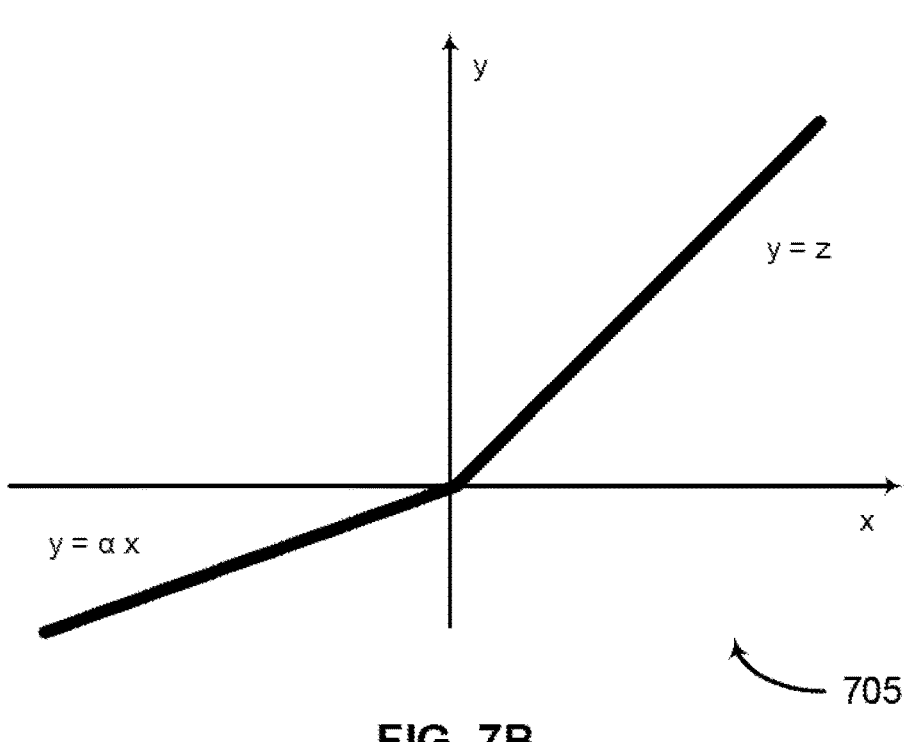

FIGS. 7A and 7B show example activation function diagrams according to aspects of the present disclosure. The example shown includes ReLU function 700 and parametric ReLU function 705. In accordance with one or more aspects described in FIGS. 7A and 7B, the flowchart of FIG. 9 may illustrate further details of layer folding techniques described herein. FIGS. 7A and 7B may illustrate an activation function A encouraged to the identity function by training a towards 1 (e.g., where α towards 1 makes the new activation function (New_Activation) towards the identity function (e.g., or an approximately affine activation function).

One or more embodiments of the present disclosure remove activations by training. Existing activations may be transformed into the following form $$\text{New\_Activation} = (1-\alpha) \cdot A + \alpha \cdot \text{Identity} \quad (1)$$

where A is the original activation function, Identity—out=in and α is the trainable parameter (initialized to zero). Next, the network is trained using α (~1) and auxiliary loss resulting in transformation of activations into identity. Additionally, identity activations may be removed and surrounding linear layers can be folded. Training is continued after the collapse to increase the network performance. For example, in a case where ReLUs are used as activations, ReLU blocks (e.g., ReLU function 700) are transformed to Parametric ReLU (e.g., parametric ReLU function 705). ReLU function 700 and Parametric ReLU function 705 can be defined mathematically as follows:

$$ReLU = \begin{cases} x, & x > 0 \\ 0, & x \le 0 \end{cases}$$

$$\text{Parametric } ReLU = \begin{cases} x, & x > 0 \\ \alpha x, & x \le 0 \end{cases}$$

In this example, an auxiliary loss of $(1-\alpha^2)$ is used.

In a neural network, an activation function may be used to transforming summed weighted inputs from a node into the activation of the node or an output. A ReLU layer may implement a rectified linear activation function, which comprises a piecewise linear function that outputs the input directly if is positive, otherwise, it outputs zero. A rectified linear activation function may be used as a default activation function for many types of neural networks. Using a rectified linear activation function may enable the use of stochastic gradient descent with backpropagation of errors to train deep neural networks. The rectified linear activation function may operate similar to a linear function, but it may enable complex relationships in the data to be learned. The rectified linear activation function may also provide more sensitivity to the activation sum input to avoid saturation. A node or unit that implements a rectified linear activation function may be referred to as a rectified linear activation unit, or ReLU for short. Networks that use a rectifier function for hidden layers may be referred to as rectified networks.

Figure 8:
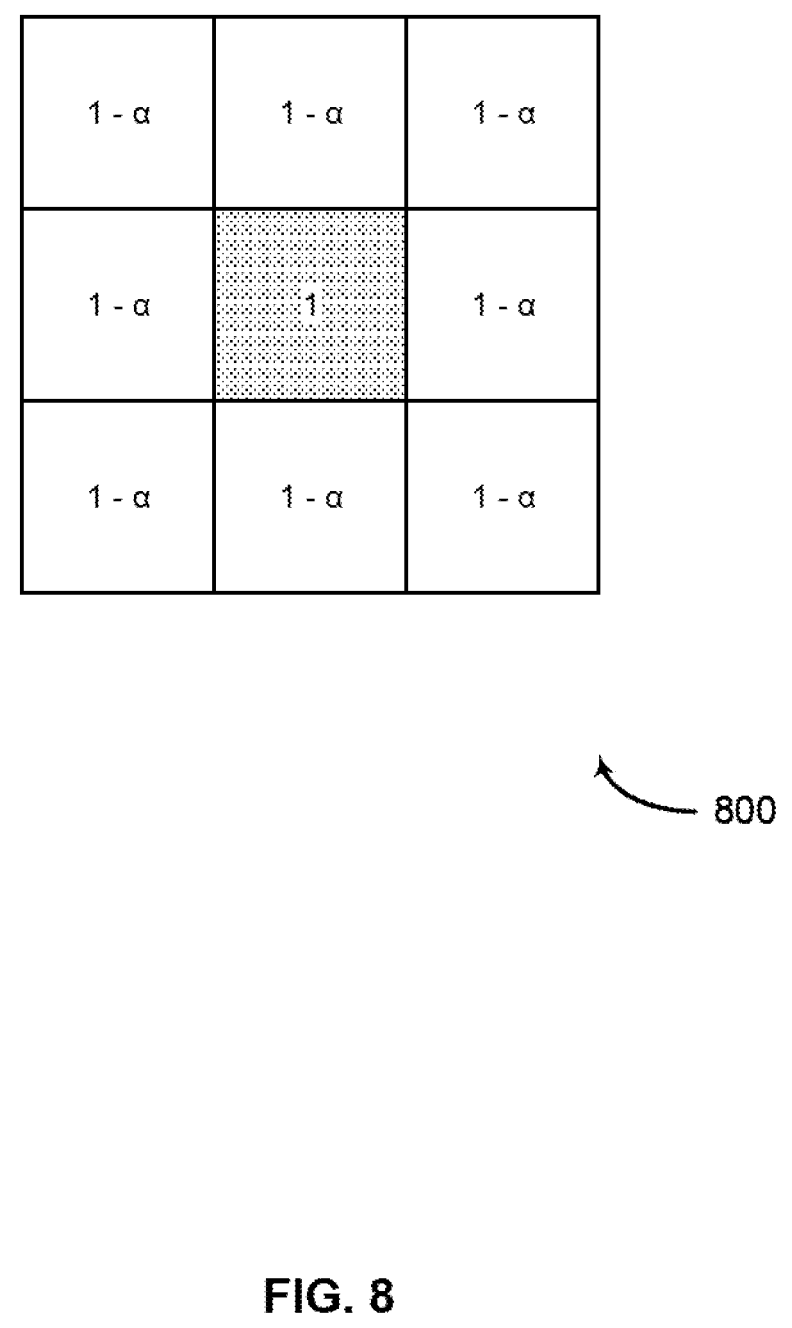

FIG. 8 shows an example of three by three convolution diagram according to aspects of the present disclosure. In accordance with one or more aspects described in FIG. 8, the example reduced neural network of FIG. 15 may illustrate further details of layer folding techniques described herein. FIG. 8 illustrates an example of a 3×3 convolution diagram that, as a approaches 1, approaches an identity function.

Folding is an alternative optimization for network reduction in convolutional neural networks which can be applied on kernels with the size of 3×3. A kernel of 3×3 convolutions was force folded to become 1×1 convolutions by multiplying the boundary of the kernel by (1−α) where α is shared with α of the activation parameter.

The activation is removed when α is 1. Therefore, when multiplying the kernel boundary by (1−α), the resulting 1×1 convolution can be folded into the next convolution without increasing the kernel size.

Figure 9:
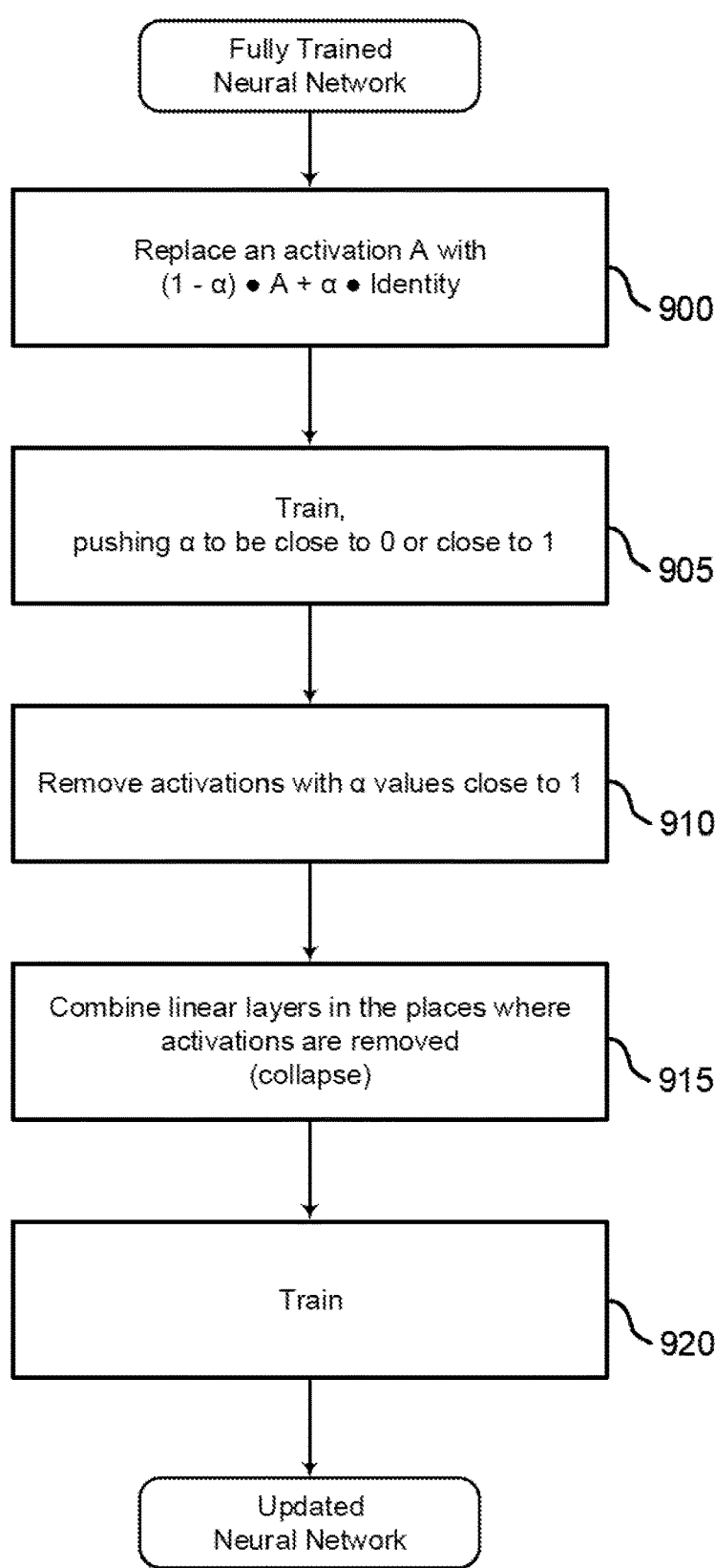
FIG. 9 shows an example of a process for designing a neural network according to aspects of the present disclosure.

FIG. 9 shows an example of a process for designing a neural network according to aspects of the present disclosure. The example of FIG. 9 illustrates a flowchart for implementing one or more aspects described with reference to FIGS. 7A and 7B. For instance, an activation function A may be replaced with a parameterized activation function that includes a linearity parameter. The linearity parameter may then be trained (e.g., iteratively adjusted) to obtain an approximately affine activation functions (e.g., based on (1−α)). As such, activation functions (e.g., non-linear activation functions) with a values close to 1 may be removed, and linear layers in places (e.g., next to or surrounding) activation functions that were removed may be combined (e.g., and folded).

The present disclosure describes a method to remove layers of a trained neural network without a decrease in accuracy. Basic layer folding and full collapse increase the network performance (i.e., decrease in number of FLOPs count) and reduce power consumption and latency over a variety of hardware architectures. One or more embodiments of the present disclosure include methods that can be used as standalone solutions or in combination with compression and network reduction techniques (e.g., pruning and quantization). The methods provide a solution to many state-of-the-art neural network architectures, reducing power consumption and execution latency on edge devices. Embodiments of the present disclosure include methods that can reduce development cycle of neural networks and reduce or remove manual network optimization.

For example, FIG. 9 shows an example of a process for neural network reduction via layer folding according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

In some examples, a neural network (e.g., a trained neural network) may include combinations of affine functions, linear functions, non-affine activation functions, non-linear activation functions, etc. (e.g., based on a NAS for a given neural network implementation). At 900, at least one activation function A (e.g., at least one non-affine or non-linear activation function) is replaced with a parameterized activation function that includes a linearity parameter (e.g., (1−α)·A+α·Identity).

At 905, the linearity parameter of the parameterized activation function may be trained (e.g., pushing a to be close to 0 or pushing a to be close to 1) to obtain an approximately affine activation function (e.g., approximately an identity function). At 910, activations (e.g., New_Activation) with a values close to 1 (e.g., where the New_Activation in Equation (1) is approximately the Identity function) may be removed (or folded). At 915, linear layers in places (e.g., linear functions in the layers) where activations are removed may be combined (e.g., folded). At 920, in some embodiments, the reduced neural network may be further trained to update (e.g., to further reduce or collapse) the reduced neural network.

FIG. 10 shows an example of a process for neural network reduction via layer folding according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

A method for neural network reduction via layer folding is described. One or more embodiments of the method include identifying a neural network that includes an affine function and a non-linear activation function and replacing the non-linear activation function with a parameterized activation function that includes a linearity parameter. One or more embodiments of the methods described further include computing an auxiliary loss term based on a value selected for the linearity parameter of the parameterized activation function, wherein the auxiliary loss term encourages the linearity parameter to approach a value of one, and iteratively updating the value for the linearity parameter of the parameterized activation function based on the auxiliary loss term to obtain an approximately affine activation function. One or more embodiments of the methods described further include combining the approximately affine activation function with the affine function of the neural network to obtain a reduced neural network.

At operation 1000, the system receives a neural network that includes an affine function and a non-linear activation function. In some cases, the operations of this step refer to, or may be performed by, a parameterization component as described with reference to FIGS. 3 and 4.

At operation 1005, the system replaces the non-linear activation function with a parameterized activation function that includes a linearity parameter. In some cases, the operations of this step refer to, or may be performed by, a parameterization component as described with reference to FIGS. 3 and 4.

At operation 1010, the system computes an auxiliary loss term based on a value selected for the linearity parameter of the parameterized activation function, where the auxiliary loss term encourages the linearity parameter to approach a value of one. In some cases, the operations of this step refer to, or may be performed by, a parameterization component as described with reference to FIGS. 3 and 4.

At operation 1015, the system iteratively updates the value for the linearity parameter of the parameterized activation function based on the auxiliary loss term to obtain an approximately affine activation function. In some cases, the operations of this step refer to, or may be performed by, a training component as described with reference to FIGS. 3 and 4.

At operation 1020, the system combines the approximately affine activation function with the affine function of the neural network to obtain a reduced neural network. In some cases, the operations of this step refer to, or may be performed by, a reduction component as described with reference to FIGS. 3 and 4.

An apparatus for neural network reduction via layer folding is described. The apparatus includes a processor, memory in electronic communication with the processor, and instructions stored in the memory. The instructions are operable to cause the processor to perform the steps of identifying a neural network that includes a affine function and a non-linear activation function, replacing the non-linear activation function with a parameterized activation function that includes a linearity parameter, computing an auxiliary loss term based on a value selected for the linearity parameter of the parameterized activation function, wherein the auxiliary loss term encourages the linearity parameter to approach a value of one, iteratively updating the value for the linearity parameter of the parameterized activation function based on the auxiliary loss term to obtain an approximately affine activation function, and combining the approximately affine activation function with the affine function of the neural network to obtain a reduced neural network.

A non-transitory computer readable medium storing code for neural network reduction via layer folding is described. In some examples, the code comprises instructions executable by a processor to perform the steps of: identifying a neural network that includes a affine function and a non-linear activation function, replacing the non-linear activation function with a parameterized activation function that includes a linearity parameter, computing an auxiliary loss term based on a value selected for the linearity parameter of the parameterized activation function, wherein the auxiliary loss term encourages the linearity parameter to approach a value of one, iteratively updating the value for the linearity parameter of the parameterized activation function based on the auxiliary loss term to obtain an approximately affine activation function, and combining the approximately affine activation function with the affine function of the neural network to obtain a reduced neural network.

A system for neural network reduction via layer folding is described. One or more embodiments of the system include identifying a neural network that includes a affine function and a non-linear activation function, replacing the non-linear activation function with a parameterized activation function that includes a linearity parameter, computing an auxiliary loss term based on a value selected for the linearity parameter of the parameterized activation function, wherein the auxiliary loss term encourages the linearity parameter to approach a value of one, iteratively updating the value for the linearity parameter of the parameterized activation function based on the auxiliary loss term to obtain an approximately affine activation function, and combining the approximately affine activation function with the affine function of the neural network to obtain a reduced neural network.

Some examples of the method, apparatus, non-transitory computer readable medium, and system further include refining the reduced neural network based on a loss function that does not include the auxiliary loss term.

Reduced Neural Networks

Figure 11:
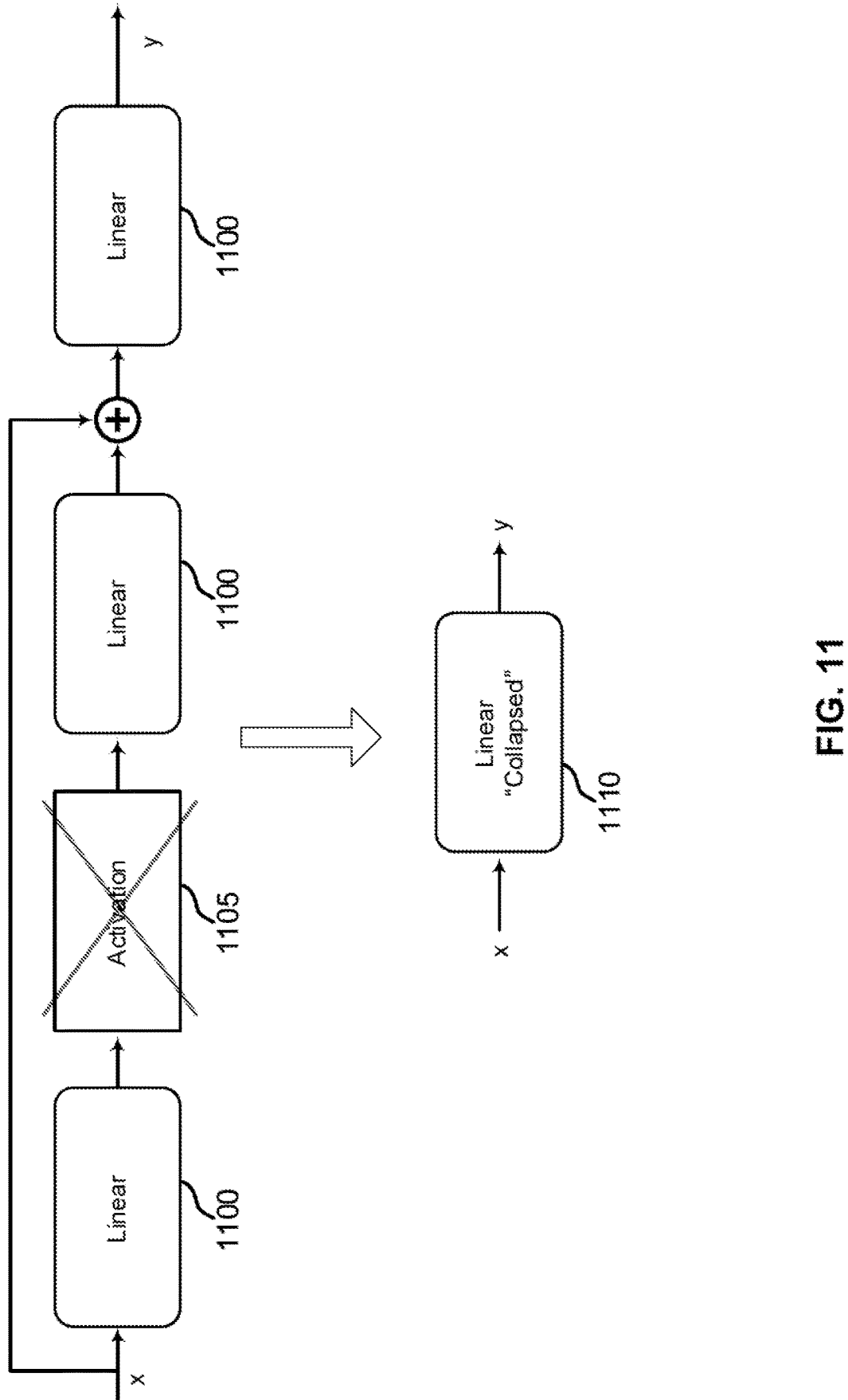
FIGS. 11 through 15 show examples of a neural network layer folding process according to aspects of the present disclosure.

FIG. 11 shows an example of a neural network layer folding process according to aspects of the present disclosure. The example shown includes linear functions 1100, activation function 1105, and folded linear function 1110. Linear functions 1100 are examples of, or include aspects of, the corresponding elements described with reference to FIG. 13. Activation function 1105 is an example of, or includes aspects of, the corresponding element described with reference to FIGS. 13 and 15. Folded linear function 1110 is an example of, or includes aspects of, the corresponding element described with reference to FIG. 13.

A neural network is a form of data processing, where input data or signals are processed with a set of operations, grouped and coined as layers. Each layer is parameterized by a set of operations, ordering of the operations and the operation coefficients, referred to as weights. A neural network comprises an architecture and weights. The layers may be linear (e.g., affine) and non-linear (e.g., nonaffine). Linear layers include convolution layers, batch normalization layers, residual connection layers, scaling layers, fully connected layers, etc. Non-linear layers are activations (e.g., ReLU, leaky ReLU, sigmoid, tangent hyperbolic, etc.), pooling, etc. and are placed between linear layers.

In some examples, a layer may refer to a function (e.g., a linear function) and an activation function. For example, a 10 layer neural network may refer to a neural network with 10 linear layers with 10 activation functions between the layers. In some cases, some activation functions may be referred to as a hidden node.

In the example of FIG. 11, one or more embodiments of the present disclosure remove activations (e.g., activation functions 1105) between layers (e.g., between layers, which may include linear functions 1100) to compress a neural network. Some operations in neural networks are linear functions 1100 separated by non-linear activations (e.g., ReLU). As a result, removing an activation function 1105 from the network creates a composition of linear (i.e., affine) operations that can be folded into an equivalent single linear layer (e.g., into a folded linear function 1110). Thus, removing activations (e.g., non-linear activation functions) may enable the removal or reduction of layers of a neural network.

Figure 12:
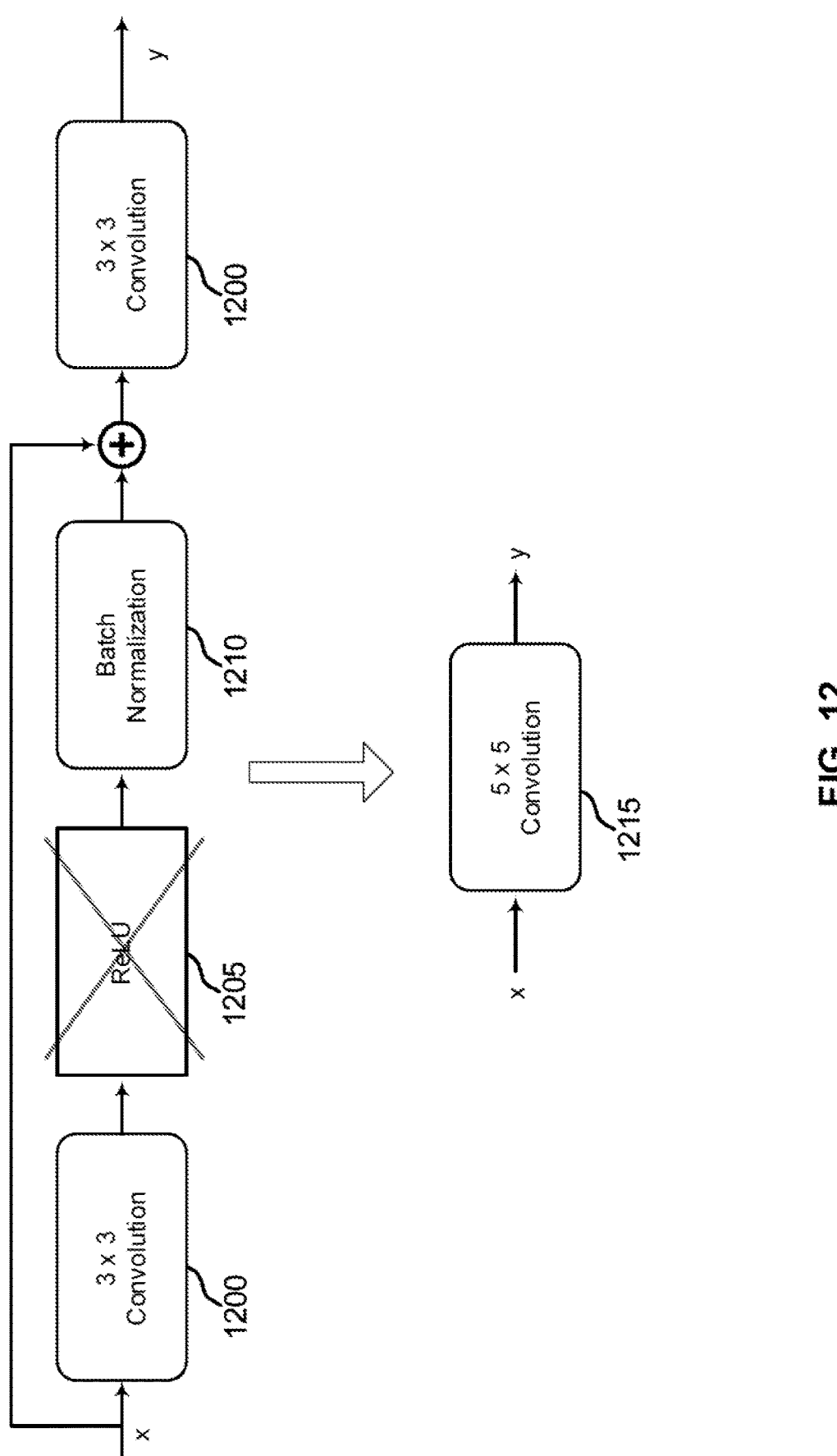

FIG. 12 shows an example of a neural network layer folding process according to aspects of the present disclosure. The example shown includes convolution functions 1200 (e.g., 3×3 convolution functions 1200), ReLU function 1205, batch normalization function 1210, and folded convolution function 1215 (e.g., 5×5 convolution function 1215). Convolution functions 1200 and folded convolution function 1215 are examples of, or each includes aspects of, the corresponding elements described with reference to FIGS. 14 and 15. ReLU function 1205 is an example of, or includes aspects of, the corresponding element described with reference to FIG. 14.

Collapsing multiple convolutions to a single convolution in convolutional neural networks increases the kernel size as the new convolution needs to maintain the same field of view of the convolutions replaced. For example, in 2 subsequent 3×3 convolutions, the total field of view for each output pixel is a rectangle of 5×5 pixels around the pixel. Thus, the kernel size should be 5×5 to collapse into a single convolution. The kernel becomes larger when more layers are folded. Presence of 1×1 convolutions do not increase the final kernel size.

Batch normalization may be used to solve internal covariate shift within a neural network. During training, as the parameters of preceding layers change, the distribution of inputs to current layer changes accordingly. Thus, the current layer may constantly readjust to new distributions. This may be especially in deep networks, because small changes in hidden layers may be amplified as they propagate within the network. This may result in a significant shift in deeper hidden layers. Batch normalization may reduce unwanted shifts to speed up training and to produce more reliable models. In some cases, networks incorporating batch normalization can use a higher learning rate without vanishing or exploding gradients. Furthermore, batch normalization may regularize a network so that it is easier to generalize.

Thus, in some cases, it may be unnecessary to use dropout to mitigate overfitting. The network may also become more robust to different initialization schemes and learning rates. Batch normalization may be achieved by fixing the mean and variance of each layer's inputs. In some cases, the normalization may be conducted over an entire training set. In other cases, normalization is restrained to each mini-batch in the training process.

Figure 13:
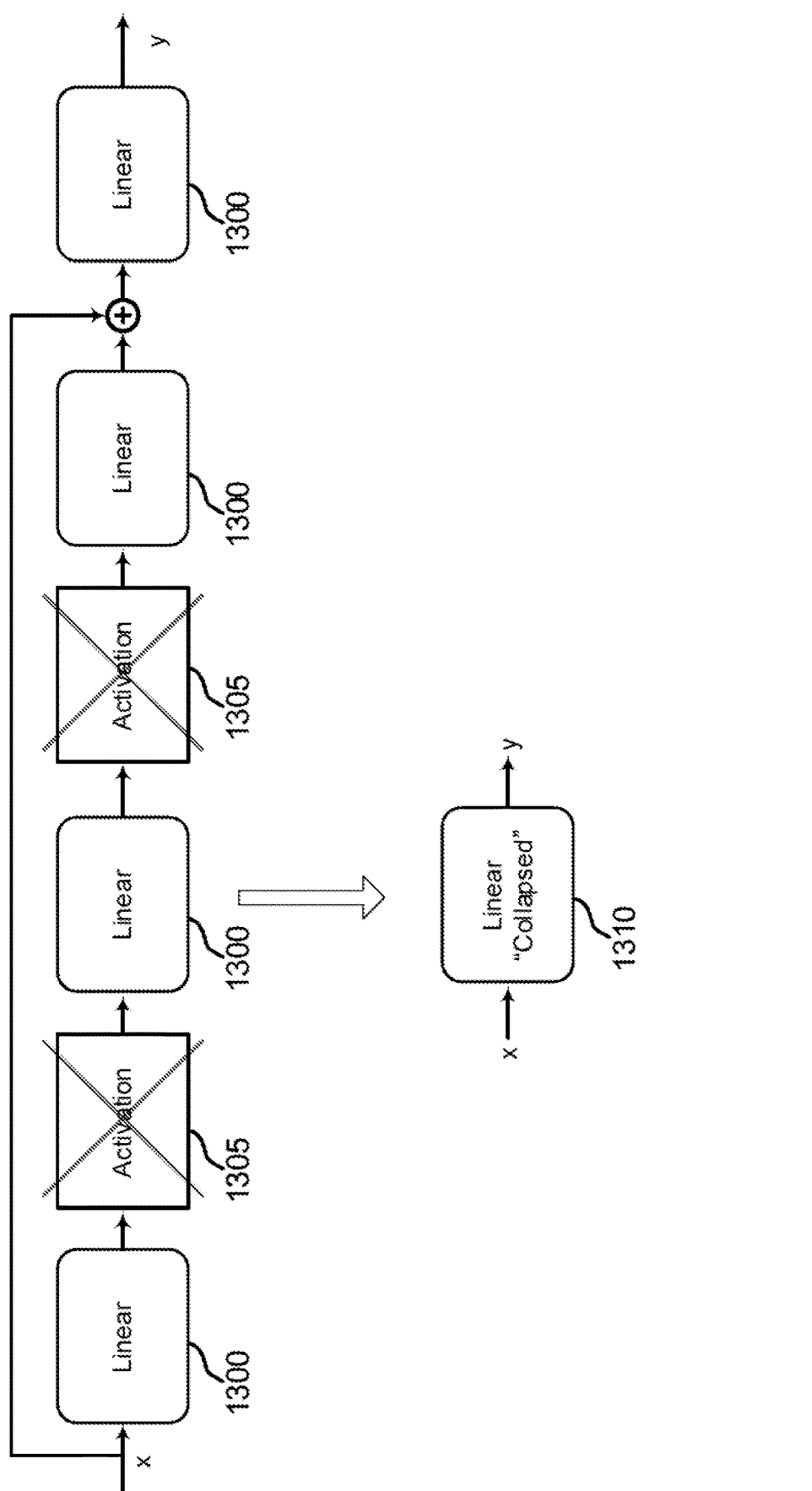

FIG. 13 shows an example of a neural network layer folding process according to aspects of the present disclosure. The example shown includes linear functions 1300, activation functions 1305, and folded linear function 1310. Linear functions 1300 are examples of, or include aspects of, the corresponding elements described with reference to FIG. 11. Activation functions 1305 are examples of, or include aspects of, the corresponding elements described with reference to FIGS. 11 and 15. Folded linear function 1310 is an example of, or includes aspects of, the corresponding element described with reference to FIG. 11.

FIG. 13 illustrates an example where a trained neural network includes 3 layers (e.g., 3 layers of, for example, 100 parameters each). The techniques described herein may be implemented to collapse the 3 layers (e.g., of 100 parameters) each down to 1 layer (e.g., of 100 parameters).

Figure 14:
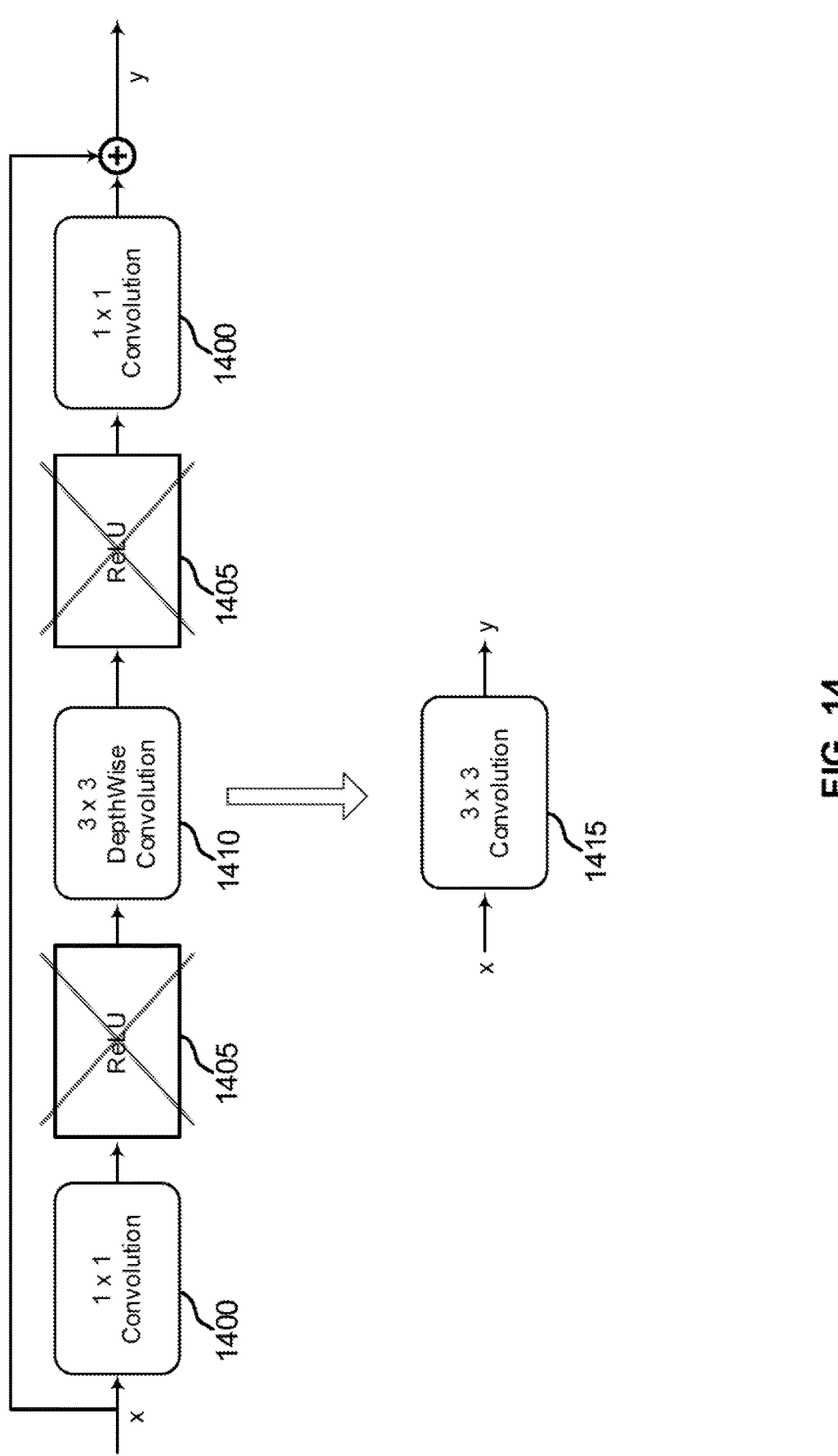

FIG. 14 shows an example of a neural network layer folding process according to aspects of the present disclosure. The example shown includes convolution functions 1400 (e.g., 1×1 convolution functions 1400), ReLU functions 1405, depth-wise convolution function 1410 (e.g., 3×3 depth-wise convolution function 1410), and folded convolution function 1415 (e.g., 3×3 convolution function 1415). Convolution functions 1400 are examples of, or include aspects of, the corresponding elements described with reference to FIGS. 12 and 15. ReLU functions 1405 are examples of, or include aspects of, the corresponding elements described with reference to FIG. 12 depth-wise convolution function 1410 is an example of, or includes aspects of, the corresponding element described with reference to FIG. 15. Folded convolution function 1415 is an example of, or includes aspects of, the corresponding element described with reference to FIGS. 12 and 15.

In some cases, the trainable parameter, $\alpha$ is shared between different activation functions to ensure that the activations are removed or kept in groups. For example, an inverted-bottleneck block is a prominent block used in modern architectures. Inverted bottleneck block comprises 3 convolutions, i.e., Expand 1×1 followed by activation, depth-wise 3×3 followed by another activation and Project 1×1. ReLU activations (e.g., ReLU functions 1405) become identity simultaneously and are removed if the activations share the same trainable parameter $\alpha$. Removal of ReLU activations (e.g., ReLU functions 1405) from the block collapses the 3 convolutions into a single 3×3 convolution (e.g., 3×3 convolution function 1415). The resulting single 3×3 convolution function 1415 is a full convolution.

Figure 15:
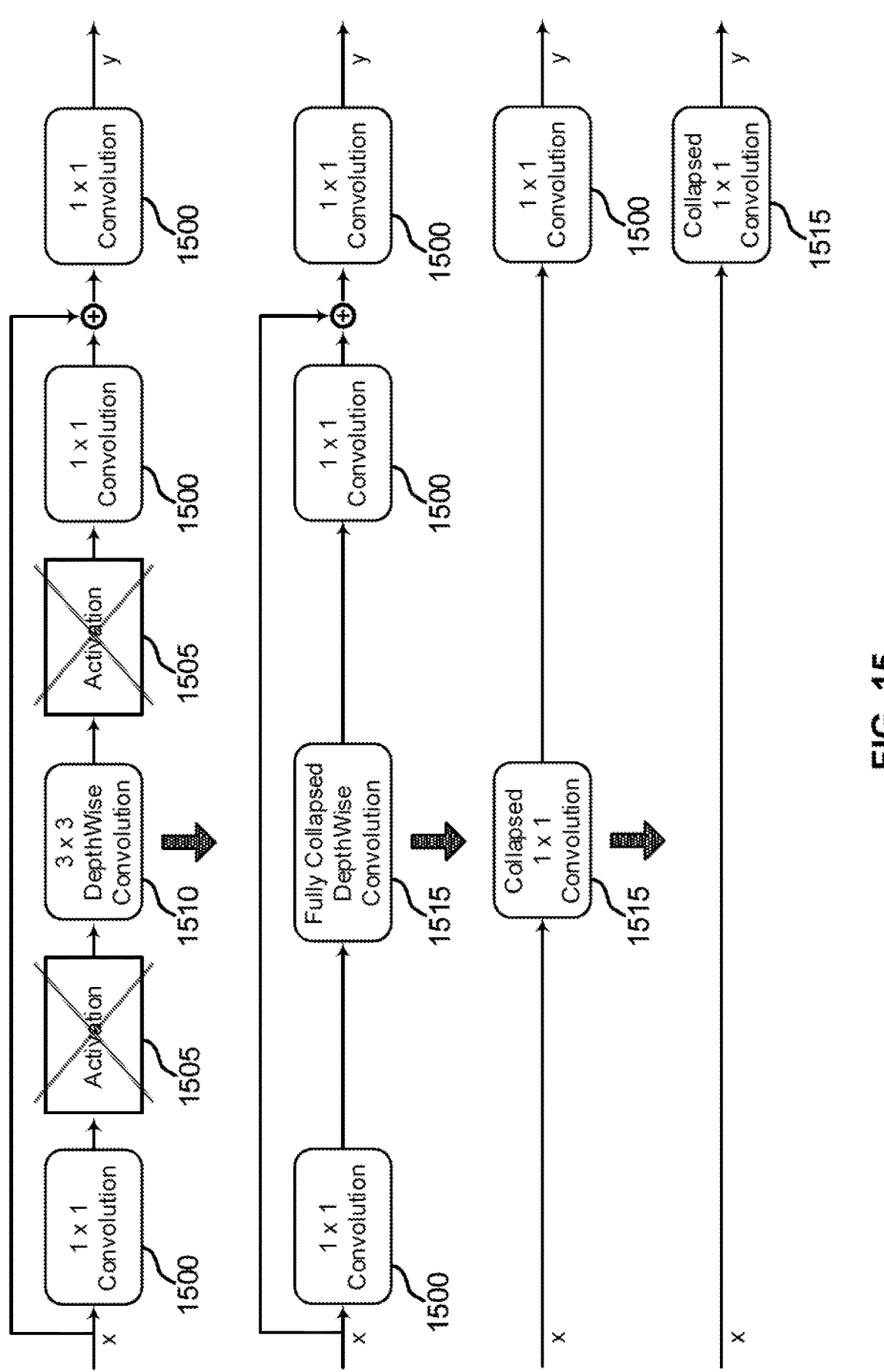

FIG. 15 shows an example of a neural network layer folding process according to aspects of the present disclosure. The example shown includes convolution functions 1500 (e.g., 1×1 convolution functions 1500), activation functions 1505, depth-wise convolution function 1510 (e.g., 3×3 depth-wise convolution functions 1510), and folded convolution function 1515 (e.g., folded 1×1 convolution function 1515). Convolution functions 1500 are examples of, or include aspects of, the corresponding elements described with reference to FIGS. 12 and 14. Activation functions 1505 are examples of, or include aspects of, the corresponding elements described with reference to FIGS.

11 and 13 depth-wise convolution function 1510 is an example of, or includes aspects of, the corresponding element described with reference to FIG. 14. Folded convolution function 1515 is an example of, or includes aspects of, the corresponding element described with reference to FIGS. 12 and 14.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described systems and methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EE-PROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
obtaining, through a cloud and by a neural network design apparatus, a neural network provided by a user device and including an affine function and a non-linear activation function;
replacing, by the neural network design apparatus, the non-linear activation function with a parameterized activation function that includes a target affine function and a product of a linearity parameter and the non-linear activation function;
iteratively adjusting, by the neural network design apparatus, the linearity parameter of the parameterized activation function to obtain an approximately affine activation function based on an auxiliary loss term that encourages the parameterized activation function to approach the target affine function;
reducing, by the neural network design apparatus, the neural network by combining the approximately affine activation function with the affine function of the neural network based on the target affine function to obtain a reduced neural network; and
sending, through the cloud and by the neural network design apparatus, the reduced neural network to the user device to allow a computing device to execute the reduced neural network.

2. The method of claim 1, wherein:
the parameterized activation function includes the non-linear activation function, an additive inverse of a product of the linearity parameter and the non-linear activation function, and a product of the linearity parameter and a target affine function.

3. The method of claim 1, wherein:
the parameterized activation function includes further comprises a product of an additional parameter and a target affine function.

4. The method of claim 1, wherein:
the iteratively adjusting the linearity parameter comprises selecting a value for the linearity parameter, computing the auxiliary loss term based on the selected value, and updating the value for the linearity parameter based on the auxiliary loss term.

5. The method of claim 1, wherein:
the auxiliary loss term encourages the linearity parameter to approach a value that causes the parameterized activation function to approach a target affine function.

6. The method of claim 1, wherein:
the combining the approximately affine activation function with the affine function of the neural network comprises combining the approximately affine activation function with a first affine function before the approximately affine activation function and a second affine function after the approximately affine activation function.

7. The method of claim 1, wherein:
the combining the approximately affine activation function with the affine function of the neural network comprises eliminating a skip connection of the neural network.

8. The method of claim 1, further comprising:

replacing a plurality of non-linear activation functions with a plurality of parameterized activation functions having a same linearity parameter; and combining the plurality of non-linear activation functions with a plurality of affine functions to obtain the reduced neural network.

9. The method of claim 8, wherein:

the plurality of non-linear activation functions is bypassed by a same skip connection.

10. The method of claim 8, wherein:

the plurality of non-linear activation functions comprises a kernel boundary of a convolutional neural network.

11. The method of claim 1, further comprising:

refining the reduced neural network based on a loss function that does not include the auxiliary loss term.

12. The method of claim 1, wherein:

the non-linear activation function comprises one or more rectified linear unit (ReLU) blocks and the parameterized activation function comprises one or more parametric ReLU blocks.

13. The method of claim 1, wherein:

the neural network comprises a convolutional neural network (CNN).

14. The method of claim 13, wherein:

the reduced neural network comprises the CNN with a reduced number of layers.

15. A method comprising:

obtaining, through a cloud and by a neural network design apparatus, a neural network provided by a user device and including an affine function and a non-linear activation function;

replacing, by the neural network design apparatus, the non-linear activation function with a parameterized activation function that includes target affine function and a product of a linearity parameter and the non-linear activation function;

computing, by the neural network design apparatus, an auxiliary loss term based on a value selected for the linearity parameter of the parameterized activation function, wherein the auxiliary loss term encourages the parameterized activation function to approach the target affine function;

iteratively updating, by the neural network design apparatus, the value for the linearity parameter of the parameterized activation function based on the auxiliary loss term to obtain an approximately affine activation function;

combining, by the neural network design apparatus, the approximately affine activation function with the affine function of the neural network to obtain a reduced neural network; and sending, through the cloud and by the neural network design apparatus, the reduced neural network to the user device to allow a computing device to execute the reduced neural network.

16. The method of claim 15, further comprising:

refining the reduced neural network based on a loss function that does not include the auxiliary loss term.

17. A neural network design apparatus comprising:

a processor; and a memory storing instructions that, when executed by the processor, cause the neural network design apparatus to:

(a) obtain, through a cloud, a neural network provided by a user device, and including an affine function and a non-linear activation function;

(b) modify the neural network by replacing the non-linear activation function with a parameterized activation function that includes a target affine function and a product of a linearity parameter and the non-linear activation function;

(c) iteratively adjust the linearity parameter of the parameterized activation function to obtain an approximately affine activation function based on an auxiliary loss term that encourages the parameterized activation function to approach the target affine function;

(d) combine the approximately affine activation function with the affine function of the neural network based on the target affine function to obtain a reduced neural network; and (e) send, through the cloud, the reduced neural network to the user device to allow a computing device to execute the reduced neural network.

18. The neural network design apparatus of claim 17, wherein:

the instructions, when executed by the processor, further cause the neural network design apparatus to select a value for the linearity parameter, compute the auxiliary loss term based on the selected value, and update the value for the linearity parameter based on the auxiliary loss term.

19. The neural network design apparatus of claim 17, wherein:

the instructions, when executed by the processor, further cause the neural network design apparatus to combine the approximately affine activation function with a first affine function before the approximately affine activation function and a second affine function after the approximately affine activation function.

20. The neural network design apparatus of claim 17, wherein:

the instructions, when executed by the processor, further cause the neural network design apparatus to replace a plurality of non-linear activation functions with a plurality of parameterized activation functions having a same linearity parameter and combine the plurality of non-linear activation functions to obtain the reduced neural network.

* * * * *